(12) United States Patent
Kim et al.

(10) Patent No.: US 11,079,495 B2
(45) Date of Patent: Aug. 3, 2021

(54) POSITION ESTIMATION UNDER MULTIPATH TRANSMISSION

(71) Applicant: Mitsubishi Electric Research Laboratories, Inc., Cambridge, MA (US)

(72) Inventors: Kyeong Jin Kim, Lexington, MA (US); Philip Orlik, Cambridge, MA (US); Chiori Hori, Lexington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 465 days.

(21) Appl. No.: 16/176,063

(22) Filed: Oct. 31, 2018

(65) Prior Publication Data

US 2020/0132861 A1 Apr. 30, 2020

(51) Int. Cl.
| | |
|---|---|
| *G01S 19/43* | (2010.01) |
| *G01S 19/22* | (2010.01) |
| *G06N 3/04* | (2006.01) |
| *G06N 3/08* | (2006.01) |
| *G01S 19/42* | (2010.01) |
| *G01S 19/50* | (2010.01) |

(52) U.S. Cl.
CPC .............. *G01S 19/43* (2013.01); *G01S 19/22* (2013.01); *G01S 19/428* (2013.01); *G01S 19/50* (2013.01); *G06N 3/049* (2013.01); *G06N 3/08* (2013.01)

(58) Field of Classification Search
CPC ........ G01S 19/22; G01S 19/428; G01S 19/50; G06N 3/0445; G06N 3/049; G06N 3/08
See application file for complete search history.

(56) References Cited

U.S. PATENT DOCUMENTS

| | | | | |
|---|---|---|---|---|
| 5,774,831 A | * | 6/1998 | Gupta | ............... G01S 19/22 342/357.31 |
| 2019/0353800 A1 | * | 11/2019 | Nirula | ............... G01S 19/22 |

OTHER PUBLICATIONS

D.-J. Jwo, GPS Navigation Solutions by Analogue Neural Network Least-Squares Processors, The Journal of Navigation, vol. 58, p. 105-118, 2005 (Year: 2005).*

* cited by examiner

*Primary Examiner* — Bernarr E Gregory
*Assistant Examiner* — Fred H Mull
(74) *Attorney, Agent, or Firm* — Gennadiy Vinokur; Hironori Tsukamoto

(57) ABSTRACT

A positioning system for tracking a position of a vehicle includes a receiver configured to receive phase measurements of satellite signals received at multiple instances of time from multiple satellites, and a memory configured to store a recurrent neural network trained to determine a position of the vehicle from a set of phase measurements in a presence of noise caused by a multipath transmission of at least some of the satellite signals at some instances of time. A processor of the positioning system is configured to track the position of the vehicle over different instances of time by processing the set of phase measurements received at each instance of time with the recurrent neural network to produce the position of the vehicle at each instance of time.

20 Claims, 19 Drawing Sheets

POSITION ESTIMATION UNDER MULTIPATH TRANSMISSION

TECHNICAL FIELD

This invention relates generally to a Global Navigation Satellite System (GNSS), and more particularly to position estimation under multipath transmission of at least some satellite signals.

BACKGROUND

Global Navigation Satellite System (GNSS) receivers, using the GPS, GLONASS, Galileo or BeiDou system, are used in many applications. The GNSS is a satellite navigation system that provides location and time information with line-of-sight (LOS) to four or more satellites. In an urban environment, reflection and refraction of the LOS satellite signals can lead to multipath transmission effecting accuracy of position estimation.

Conventional GNSSs use temporal and spatial diversity to minimize problems with multipath of the satellite signals. The temporal methods use differences in time delays between the multipath signals and the LOS signal. However, those methods are computationally complex and ineffective when the delays of the multipath signals are short.

The spatial methods use multiple antennas for multipath detection and mitigation. For example, the method described in U.S. Pat. No. 7,642,957 uses two antennas to receive signal in a hope that at least one antenna receives a "good" signal resulted from constructively interfered signals. However, the constructive interference of satellite signals cannot be guaranteed, and all antennas of such a GNSS system can be subject to the same multipath degradation.

Accordingly, there is still a need for a method and a system for a position estimation under multipath transmission of at least some satellite signals GNSS signals.

SUMMARY

Some embodiments are based on understanding that it is natural to first detect a multipath in the transmission of the satellite signals, remove the signals received from the multipath transmission, and only after that estimate the position based on the measurements of the remaining satellite transmissions. However, multipath detection can be a complex process. Thus, such an approach can be computationally burdensome and time consuming preventing a rapid position estimation in the presence of the multipath transmission.

To that end, it is an object of some embodiments to estimate a position of a vehicle without testing for the multipath transmission. Avoidance of multipath detection can increase the rapidness of position estimation, reduce computational burden of a computer determining the position, and/or adapt the position estimation for distributed applications, e.g., that can be implemented in a cloud.

Some embodiments are based on a realization that when the satellite transmission from multiple satellites include multipath transmission and line-of-sight (LOS) transmission, such a transmission can be treated as a noisy signal including a clean signal represented by the LOS transmission and the noise on the clean signal represented by the multipath transmission. In this analogy, position estimation with the multipath detection is an equivalent to a noise estimation/removal with subsequent position estimation based on the clean signal. However, some embodiments aim to perform the position estimation directly from the noisy signal.

Some embodiments are based on recognition that the machine learning techniques can be applied for position estimation from the noisy signal. Using machine learning, the collected data, e.g., phase measurements of the satellite signals, can be utilized in an automatic position estimation system, where the temporal dependencies of the data can be learned through training. For example, a neural network is one of the machine learning techniques that can be practically trained for complex systems that include different types of noisy signals. To that end, it is an object of some embodiments to provide a neural network trained to performed position estimation directly from a noisy signal including phases measured from satellite signals received from the LOS and multipath transmissions.

However, in contrast to a number of noisy signals, the noise in the noisy signal of the phase measurements has the same nature as the clean signal itself, i.e., both the noise and clean signal are phase measurements. For example, a neural network can be used to recognize words in the noisy speech utterance. However, in contrast with the position estimation, the noise in the noisy speech utterance has different characteristics than the clean speech in that utterance. To that end, a neural network suitable for processing one type of the noisy signal may not be suitable for position estimation based on the noisy phase measurements.

Some embodiments are based on recognition that when the position estimation is performed for a moving vehicle, the dynamics of changes of the multipath transmission over time is different from the dynamics of changes in the LOS transmission. In such a manner, for time-series phase measurements, the characteristics of the noise, i.e., the multipath transmission, are indeed different from the characteristics of the clean signal, i.e., the LOS transmission.

To that end, some embodiments train a recurrent neural network (RNN) to determine a position of the vehicle from a set of phase measurements in a presence of noise caused by a multipath transmission of at least some of the satellite signals at some instances of time. A RNN is a class of artificial neural network where connections between nodes form a directed graph along a sequence. This allows it to exhibit dynamic temporal behavior for a time sequence. Unlike feedforward neural networks, RNNs can use their internal state (memory) to process sequences of inputs. This makes them applicable to tasks such as unsegmented, connected handwriting recognition or speech recognition. However, some embodiments recognize that the RNN can be adopted for multipath-free position estimation.

Accordingly, this disclosure describe a positioning system for tracking a position of a vehicle, that includes a receiver configured to receive phase measurements of satellite signals received at multiple instances of time from multiple satellites; a memory configured to store a RNN trained to determine a position of the vehicle from a set of phase measurements in a presence of noise caused by a multipath transmission of at least some of the satellite signals at some instances of time; and a processor configured to track the position of the vehicle over different instances of time by processing the set of phase measurements received at each instance of time with the RNN without testing the phase measurements for the multipath transmission to produce the position of the vehicle at each instance of time.

For example, in one embodiment, the RNN uses an attention-based multimodal fusion to output the position in response to receiving the set of phase measurements. For example, the RNN applies different weights to at least some different phase measurements to produce a set of weighted phase measurements and determines the position of the vehicle from the set of individually weighted phase measurements. In such a manner, the RNN is trained to minimize, e.g., using weights, the negative impact of the multipath transmission on position estimation.

In order to train a RNN, there is a need for data relating the phase measurements with position estimation determined from the clean signal free of multipath. Some embodiments are based on recognition that log files of various commercially available navigators can provide such data. To that end, some embodiments train the RNN with information extracted from those log files. The embodiments allow using different log files of the same or different routes collected from the same or different navigators to train the RNN offline. Additionally, or alternatively, one embodiment performs online position estimation using various navigators and train the RNN using the log files of the utilized navigator until the trained RNN achieves the target accuracy of the position estimation.

However, through experimentation and testing, some embodiments are based on understanding that training of the RNN is very data demanding task. Specifically, in contrast with classification task of the neural network aimed to classify the input, such as noise and not noise, the position estimation is a numerical problem requiring much more data for the training than the classification tasks. In some embodiments, this problem is overcome by spending more time on training the RNN. Additionally, or alternatively, in some embodiments, this problem is overcome by reducing an area where the RNN is trained to perform the position estimation.

For example, in one embodiment, the RNN is trained for a specific path, such that the processor tracks the position of the vehicle traveling along at least a portion of the specific path. In such a manner, the neural network is trained for the path with data collected from traveling along that path, which reduce the amount of data sufficient to train the RNN. For some applications, this limitation is not even a problem. For example, trains travel along the predetermined paths, and some embodiments use the RNN trained to determine the position of a train traveling along a specific path.

Additionally, or alternatively, some embodiments use multiple RNNs trained for different paths. Those embodiments add a flexibility in the position estimation, because different RNNs can be trained and updated separately, i.e., independently from each other. For example, in one embodiment, memory of the positioning system stores a set of RNNs, each RNN is trained for a specific path, and the processor of the positioning system selects the RNN from the set of RNNs for the tracking. Notably, one implementation of this embodiment allows using different RNNs from the set of RNNs during the tracking. Various methods can be used for selecting the current RNN from the memory. For example, one embodiment uses a coarse position estimation, and or current position from the tracking to select the current RNN.

Some embodiments are based on realization that avoidance of separate multipath detection process makes the position estimation adaptable for distributed applications. For example, in some embodiments, the positioning system is a distributed system implemented over a vehicular network including the vehicle in communication with an access point of the vehicular network. In such a manner, some elements of the positioning system can be implemented on a vehicle, and some elements can be implemented on an access point and/or other systems operatively connected to the access point.

For example, in one embodiment, the vehicle includes a transceiver to transmit the phase measurements to the access point and to receive estimates of the position of the vehicle from the access point. The position estimation is performed by the access point (and/or other systems operatively connected to the access point) and transmitted back to the vehicle. In such a manner, the RNN is stored in the memory of the access point and is trained to determine positions in an area of the vehicular network covered by the access point. When the vehicle moves between the areas covered by different access points, unbeknownst to the vehicle, different access points track the position of the vehicle with different RNNs.

Accordingly, one embodiment discloses a positioning system for tracking a position of a vehicle that includes a receiver configured to receive phase measurements of satellite signals received at multiple instances of time from multiple satellites; a memory configured to store a recurrent neural network trained to determine a position of the vehicle from a set of phase measurements in a presence of noise caused by a multipath transmission of at least some of the satellite signals at some instances of time; and a processor configured to track the position of the vehicle over different instances of time by processing the set of phase measurements received at each instance of time with the recurrent neural network to produce the position of the vehicle at each instance of time.

Another embodiment discloses a positioning method for tracking a position of a vehicle, wherein the method uses a processor coupled with stored instructions implementing the method, wherein the instructions, when executed by the processor carry out at least some steps of the method, including receiving phase measurements of satellite signals received at multiple instances of time from multiple satellites; accessing a recurrent neural network trained to determine a position of the vehicle from a set of phase measurements in a presence of noise caused by a multipath transmission of at least some of the satellite signals at some instances of time; and tracking the position of the vehicle over different instances of time by processing the set of phase measurements received at each instance of time with the recurrent neural network to produce the position of the vehicle at each instance of time.

Yet another embodiment discloses a non-transitory computer readable storage medium embodied thereon a program executable by a processor for performing a method. The method includes receiving phase measurements of satellite signals received at multiple instances of time from multiple satellites; accessing a recurrent neural network trained to determine a position of the vehicle from a set of phase measurements in a presence of noise caused by a multipath transmission of at least some of the satellite signals at some instances of time; and tracking the position of the vehicle over different instances of time by processing the set of phase measurements received at each instance of time with the recurrent neural network to produce the position of the vehicle at each instance of time.

DETAILED DESCRIPTION

Figure 1:
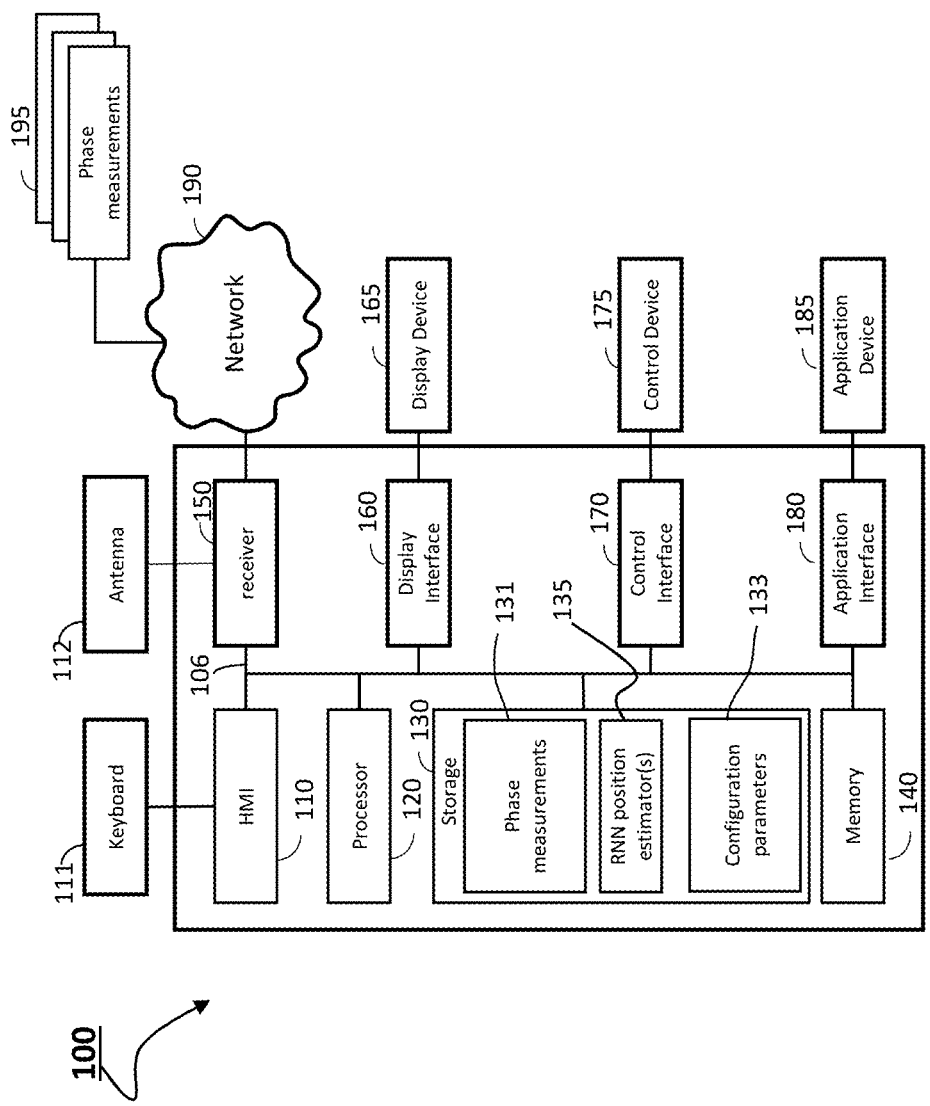
FIG. 1 shows a block diagram of global navigational satellite system (GNSS) according to some embodiments.

FIG. 1 shows a block diagram of global navigational satellite system (GNSS) 100 according to some embodiments. The GNSS is a satellite navigation system that provides location and time information with line-of-sight (LOS) to four or more satellites. In some embodiments, the GNSS is configured for tracking a position of a vehicle, e.g., to produce the position of the vehicle at each instance of time. In an urban environment, reflection and refraction of the LOS satellite signals can lead to multipath transmission affecting accuracy of position estimation. To that end, the GNSS system tracks the position of a vehicle in consideration of the multipath transmission.

The GNSS 100 includes a processor 120 configured to execute stored instructions, as well as a memory 140 that stores instructions that are executable by the processor. The processor 120 can be a single core processor, a multi-core processor, a computing cluster, or any number of other configurations. The memory 140 can include random access memory (RAM), read only memory (ROM), flash memory, or any other suitable memory systems. The processor 120 is connected through a bus 106 to one or more input and output devices. These instructions implement a method for tracking the position of a vehicle.

The GNSS is configured to track the position of a vehicle in consideration of the multipath transmission and without a need to determine whether a specific transmission is multipath of an LOS transmission. To that end, the GNSS 100 uses a recurrent neural network (RNN) 135 trained to determine a position of the vehicle from a set of phase measurements 131 in a presence of noise caused by a multipath transmission of at least some of the satellite signals at some instances of time. For example, a storage device 130 can be adapted to store the trained RNN position estimator 135. The storage device 130 can be implemented using a hard drive, an optical drive, a thumb drive, an array of drives, or any combinations thereof.

In turn, the processor, using the instruction stored in the memory, is configured to track the position of the vehicle over different instances of time by processing the set of phase measurements received at each instance of time with the recurrent neural network to produce the position of the vehicle at each instance of time. Notably, the processor tracks the positon from the phase measurements directly without testing the phase measurements for the multipath transmission.

The GNSS 100 includes a receiver 150 configured to receive phase measurements of satellite signals received at multiple instances of time from multiple satellites. In one embodiment, the receiver uses an antenna 112 to accept satellite signals from different satellites and to determine the phase measurements 131. For example, the receiver is able to distinguish phase measurements from the other signals by detecting a unique header attached in front of the phase measurements. Additionally, or alternatively, the receiver can receive phase measurements 195 over a network 190 and store them in the storage as the measurements 131. Through the network 190, the phase measurements 195 can be downloaded and stored within the computer's storage system 130 for storage and/or further processing. The network 190 can be wired and/or wireless network. In cases when measurements 195 are determined by a remote device, the GNSS system 100 can track the position of the remote device.

In some implementations, a human machine interface 110 within the GNSS 100 connects the system to a keyboard and/or pointing device 111, wherein the pointing device 111 can include a mouse, trackball, touchpad, joy stick, pointing stick, stylus, or touchscreen, among others. In some implementations, the GNSS includes configuration parameters 133 stored in the storage 130. For example, in some implementations, the GNSS includes multiple recurrent neural networks 135 and the configuration parameters specify rules for using different neural networks. For example, the configuration parameters can be received though network 190 or through HMI 110.

The GNSS 100 can be linked through the bus 106 to a display interface 160 adapted to connect the GNSS 100 to a display device 165, wherein the display device 565 can include a computer monitor, camera, television, projector, or mobile device, among others.

The GNSS 100 can also be connected to a control interface 170 adapted to connect the system to a controller device 175. For example, the controller can control the motion of the vehicle based on GNSS position estimates of the GNSS. For example, the controller device 175 can control acceleration and/or turning of the wheel of the vehicle.

In some embodiments, the GNSS 100 is connected to an application interface 180 through the bus 106 adapted to connect the GNSS 100 to an application device 185 that can operate based on results of position estimation. For example, the device 185 is an information system that uses the locations of the vehicle to alert a driver.

In various embodiments, the GNSS system is configured to track the position of a vehicle using a neural network. The neural network is computing systems vaguely inspired by the biological neural networks that constitute animal brains. Such systems "learn" to perform tasks by considering examples, generally without being programmed with any task-specific rules. Because tracking the position of a vehicle in consideration of the multipath transmission is a computationally demanding task, the usage of the neural network can provide memory and computational savings.

In addition, it is an object of some embodiments to estimate a position of a vehicle without testing for the multipath transmission. Avoidance of multipath detection can increase the rapidness of position estimation, reduce computational burden of a computer determining the position, and/or adapt the position estimation for distributed applications, e.g., that can be implemented in a cloud.

Figure 2:
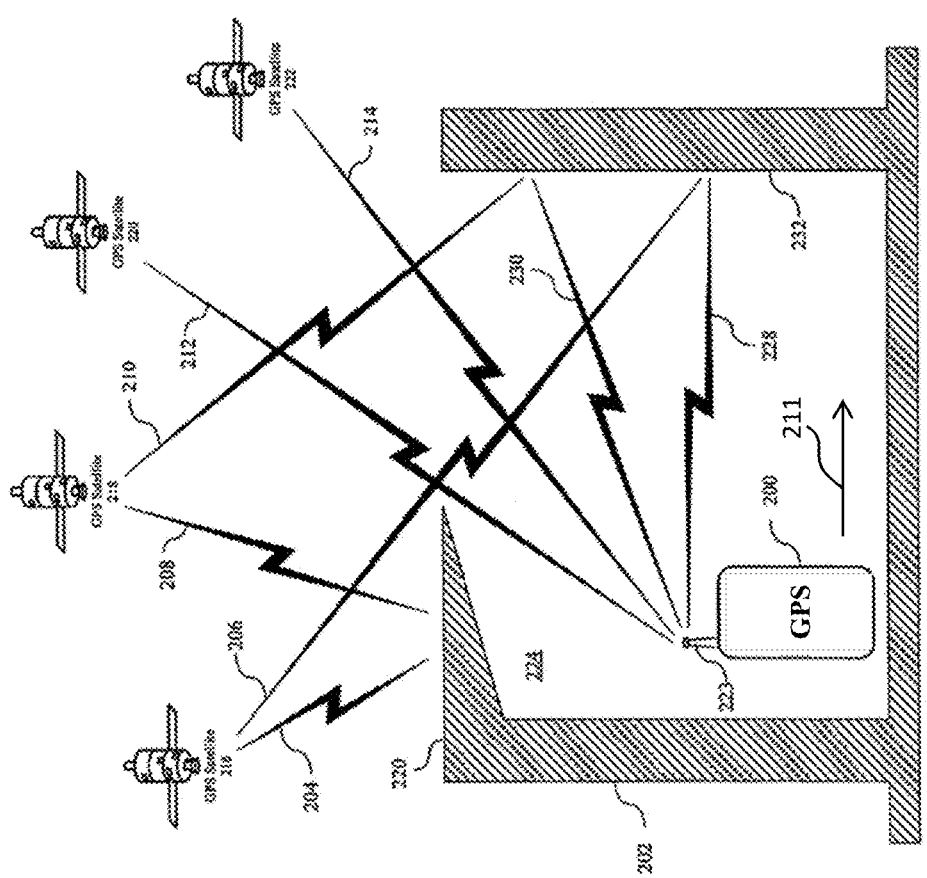
FIG. 2 shows a schematic of a GNSS receiver moving in a multipath environment according to some embodiments.

FIG. 2 shows a schematic of a GNSS receiver 200 moving 211 in a multipath environment according to some embodiments. The GNSS receiver 200 can be located in proximity with a structure 202 that partially blocks some to the GNSS signals 204, 206, 208, and 210 from GNSS satellites 216, and 218, respectively. The structure 202, as an example, may be a building, natural or man-made environmental structure, such as a canyon wall or street in a city with tall building. However, the structure 202 does not block the direct GNSS signals 212, and 214 from GNSS satellites 220, and 222. As the GPS receiver 200 moves, the combination of blocked and received GNSS signals, or a composite signal of direct and reflected signals, from different satellites changes over time.

In this example, a GNSS antenna 223 receives signals from each GNSS satellite 216, 218, 220, and 222 via multiple paths reflected from the blockage or possible objects in the structure 202. The multipath signals can result in constructive or destructive interference, with constructive interference increasing signal power and destructive interference reducing signal power. Generally, when the GNSS antenna 223 receives destructive multipath interference, also known as "flat fading" the signal cannot be recovered.

Specifically, as an example, GNSS signals 204 and 208 are blocked by part 220 of the structure 202 while GNSS signals 206, 210, 212, and 214 pass though free space 224. However, in this example, only GNSS signals 212 and 214 are directly received by GNSS receiver 200, while GNSS signals 206 and 210 are indirectly received by the GNSS receiver 200 via multipath GNSS signals 228 and 230, respectively that are reflected off of another structure 232.

Another possibility of multipath propagation is a combination of a direct line-of-sight GNSS signal with reflected, non-line-of-sight or delayed version of that GNSS signal. In this case, the two versions of the GNSS signal can potentially have different delays, amplitudes, phases, and frequencies. The multipath will interfere with the direct GNSS signal. Thus, the code and carrier tracking loops result in errors due to tracking the composite signals. For instance, the resulting code tracking error depends on several aspects such as path delay of the reflected signal with respect to the direct GNSS signal, the relative strengths of them, and phase differences between them.

To mitigate multipath interference on code phase measurement, several receiver-based approaches such as the double-delta discriminator, gated correlator, and vision correlator have been proposed. Thus, without applying an additional operation, for instance, the receiver-based approach, multipath signal is not easily distinguishable from the noisy signal at each instant of time, and the tracking error is inevitable. In addition, there is no deterministic model to specify accurately the dynamic multipath signal with respect to the mobile GNSS receiver 200.

Some embodiments are based on a realization that when the satellite transmission from multiple satellites include multipath transmission and LOS transmission, such a transmission can be treated as a noisy signal including a clean signal represented by the LOS transmission and the noise on the clean signal represented by the multipath transmission. In this analogy, position estimation with the multipath detection is an equivalent to a noise estimation/removal with subsequent position estimation based on the clean signal. However, some embodiments aim to perform the position estimation directly from the noisy signal.

Some embodiments are based on recognition that the machine learning techniques can be applied for position estimation from the noisy signal. Using machine learning, the collected data, e.g., phase measurements of the satellite signals, can be utilized in an automatic position estimation system, where the temporal dependencies of the data can be learned through training. For example, a neural network is one of the machine learning techniques that can be practically trained for complex systems that include different types of noisy signals. To that end, it is an object of some embodiments to provide a neural network trained to performed position estimation directly from a noisy signal including phases measured from the satellite signals received from the LOS and multipath transmissions.

However, in contrast to a number of noisy signals, the noise in the noisy signal of the phase measurements has the same nature as the clean signal itself, i.e., both the noise and clean signal are phase measurements. For example, a neural network can be used to recognize words in the noisy speech utterance. However, in contrast to the position estimation, the noise in the noisy speech utterance has different characteristics from the clean speech in that utterance. To that end, a neural network suitable for processing one type of the noisy signal may not be suitable for position estimation based on the noisy phase measurements.

Some embodiments are based on recognition that when the position estimation is performed for a moving vehicle, the dynamics of changes of the multipath transmission over time is different from the dynamics of changes in the LOS transmission. In such a manner, for time-series phase measurements, the characteristics of the noise, i.e., the multipath transmission, are indeed different from the characteristics of the clean signal, i.e., the LOS transmission. For example, the dynamic behavior of multipath signal 228 and/or 230 is different from dynamic behavior of a clean direct GNSS signal 206 and/or 210, which does not compound the multipath signal.

Accordingly, some embodiments train a RNN to determine a position of the vehicle from a set of phase measurements in a presence of noise caused by a multipath transmission of at least some of the satellite signals at some instances of time. The RNN is a class of artificial neural network, which connects between nodes to form a directed graph along a sequence. This allows it to exhibit dynamic temporal behavior for a time sequence. Unlike feedforward neural networks, RNNs can use their internal state (memory) to process sequences of inputs. This makes them applicable to tasks such as unsegmented, connected handwriting recognition or speech recognition. However, some embodiments recognize that the RNN can be adopted for multipath-free position estimation.

Figure 3:
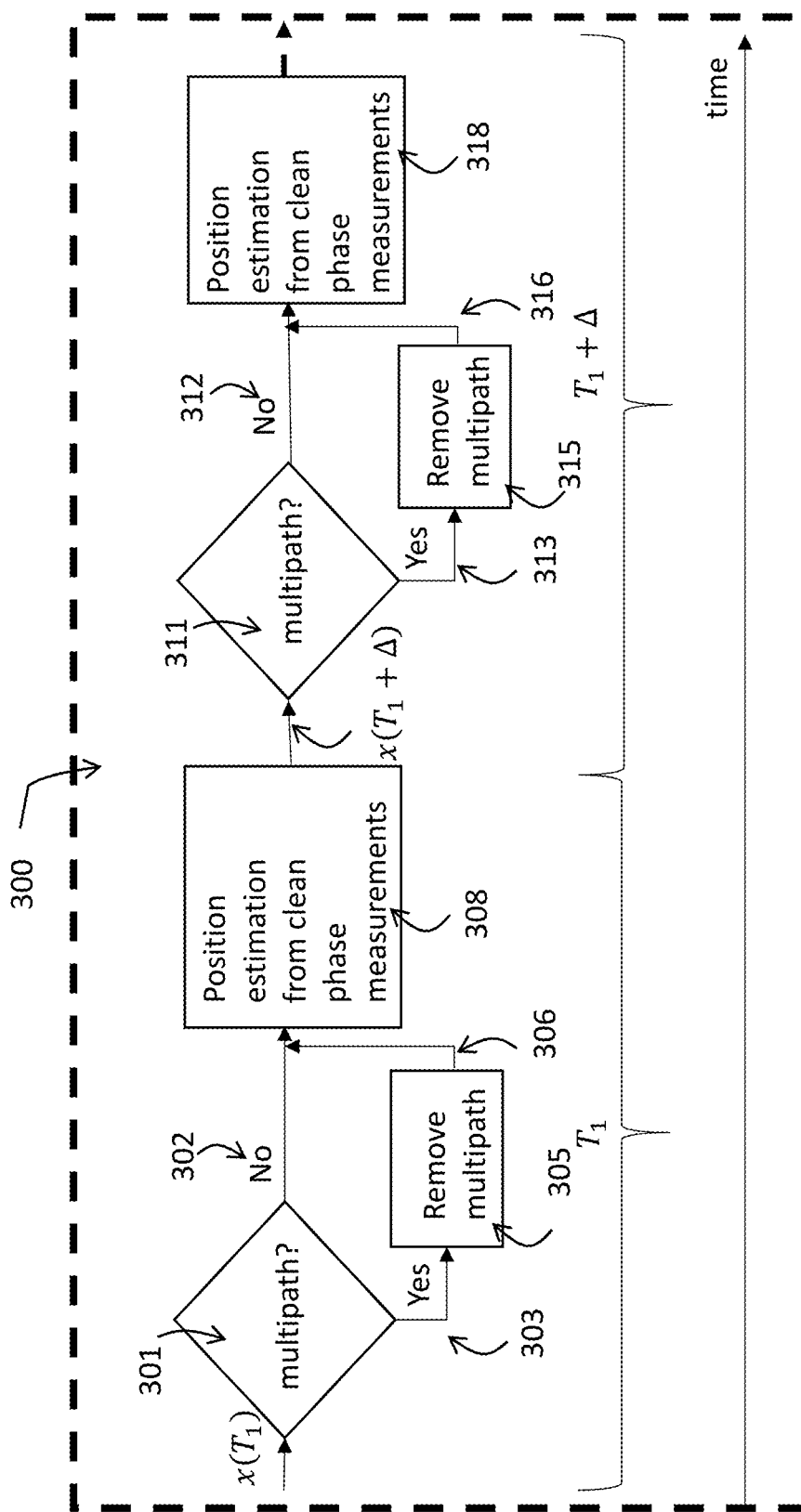
FIG. 3 shows a block diagram of a method for position estimation from multi-paths free satellites signal addressed by some embodiments.

FIG. 3 shows a block diagram of a method 300 for position estimation from multi-path free satellites signals addressed by some embodiments. The method 300 includes sequential steps 301 and 311, etc., for multipath detection followed by multipath removal 305 and 315, and position estimation from clean phase measurements 308 and 318. For example, at processing time $T_1$, from the phase measurement $x(T_1)$, the method detects 301 whether multipath signals 303 or not 302. If multipath exists, the method removes 305 the multipath signal from its input composite GNSS signal, and then generates a clean signal 306. Using clean GNSS signal from either 302 or 306, the method performs position estimation from clean phase measurement, 308. At the next processing time $T_1+\Delta$, similar operation is made by the processing blocks, 311, 315, and 318 by the next clean GNSS signal from either 312 or 316 from the input measurement $x(T_1+\Delta)$ according to the decision made by either 312 or 313.

Figure 4:
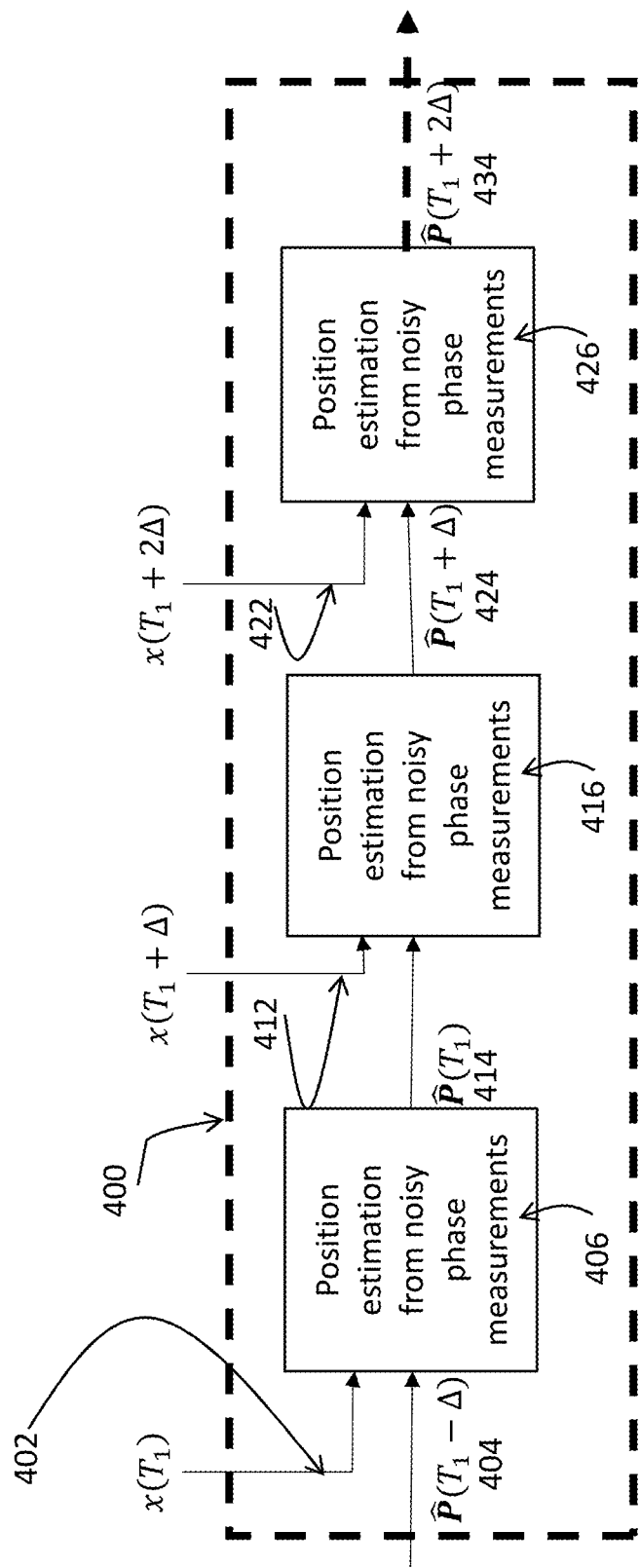
FIG. 4 shows a block diagram of a method used by RNN position estimator 135 according to some embodiments.

FIG. 4 shows a block diagram of a method 400 used by RNN position estimator 135 according to some embodiments. At a different processing time, for instance, $T_1$, position estimate, $\hat{P}(T_1)$, 414, is obtained by block, 406, from noisy phase measurement, $x(T_1)$, 402, and by an aide from the last position estimate, $\hat{P}(T_1-\Delta)$, 404. For the next processing time, $T_1+\Delta$, block 416 outputs $\hat{P}(T_1+\Delta)$, 424, based on noisy phase measurement, $x(T_1+\Delta)$, 412 and position estimate $\hat{P}(T_1)$, 414. Similarly, $\hat{P}(T_1+2\Delta)$, 434, is generated from block 426 by using $x(T_1+2\Delta)$, 422 and $\hat{P}(T_1+\Delta)$, 434. For the following processing times, the same procedures are accomplished from this embodiment.

Notably, the method 400 uses the sequential noisy GNSS phase measurements, 402, 412, and 422, rather than the clean GNSS signal as in the method 300. In addition, the history of the position estimations 404, 414, and 424, are influencing the position estimations 414, 424, and 434. RNN is more advantageous to work with sequence prediction problems than some other types of neural network, some embodiments use RNN for the sequential position estimation of GNSS systems, in which the GNSS satellites and/or GNSS receivers are moving.

Some embodiments are based on recognition that the RNN can be trained from phase measurements signals to perform multipath detection and/or position estimation. For example, in some embodiments, RNN is designed by using encoder-decoder architecture. The encoder is trained to learn a set of input GNSS phase measurements, the decoder converts the outputs of the encoder into a set of predicted GNSS signal measurements used for the position estimation by extracting a fixed number of features that characterize the temporal dependencies of the set of phase measurements. As an extension of the feed-forward neural network, the RNN makes connection between the current and past information by adding an edge between hidden states adjacent over processing time, in which the current state value of a hidden layer is influenced by the current phase measurement, 402, 412, and 422, and the previous state value of the hidden layer. Thus, an unknown background information about differences in noise characteristics existing between the input phase measurements can be exploited by the RNN.

Some embodiments are based on recognition that multipath estimation is an individual process, i.e., multipath caused by one particular satellite signal is independent from other satellites' signals. For example, multipath of signal 228 is independent from the multipath of signal 230, shown in FIG. 2. However, the position estimation is a joint process since at least four satellites' signals are required at the receiver 200. Thus, there is a need to use multiple satellites signals together in the frame of the RNN. To that end, in some embodiments, the recurrent neural network uses an attention-based multimodal fusion architecture to perform position estimation in response to receiving the set of phase measurements.

Figure 5A:
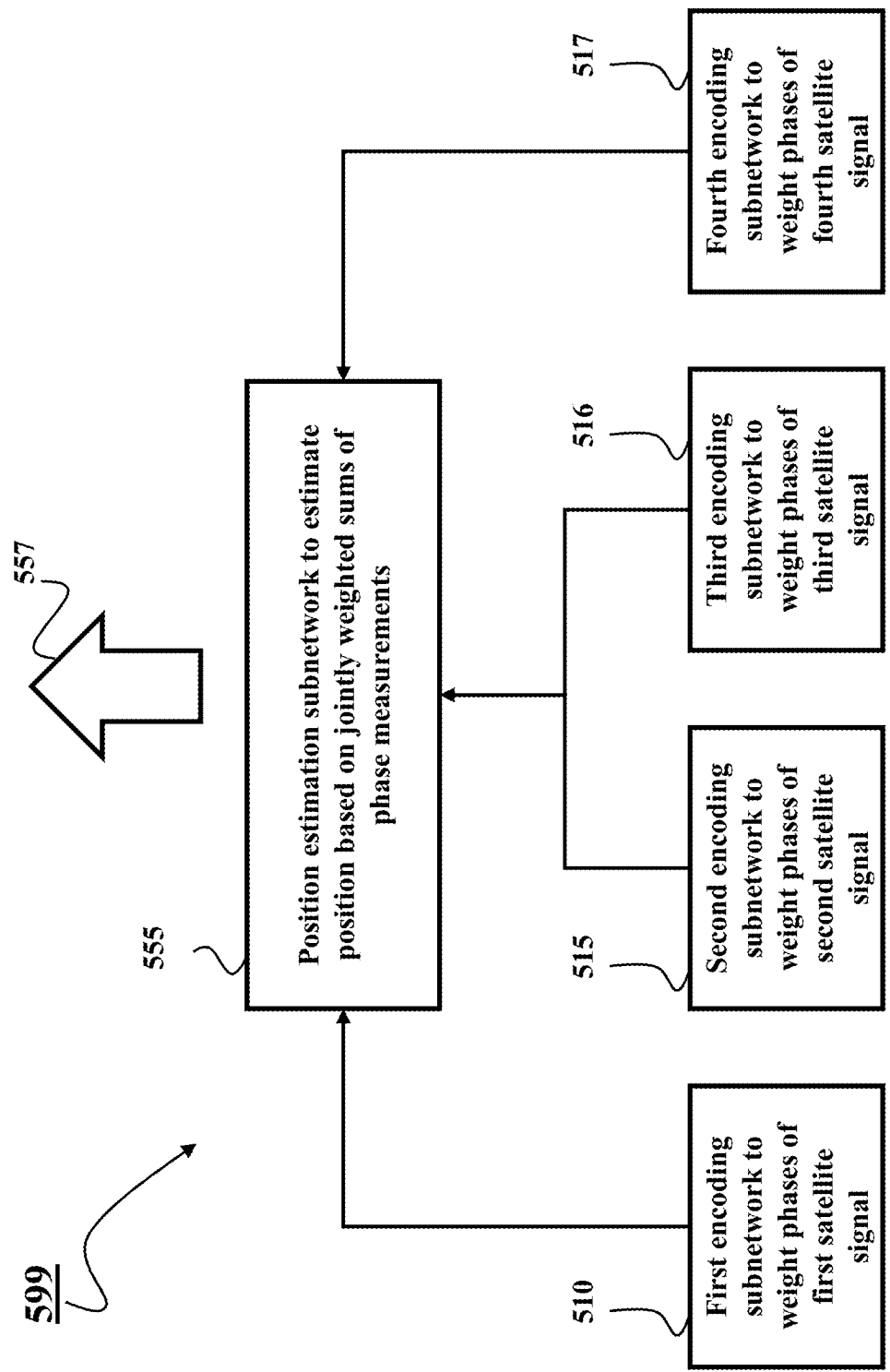
FIG. 5A shows a block diagram of an architecture of the attention-based multimodal fusion RNN used by RNN position estimator(s) of some embodiments.

FIG. 5A shows a block diagram of an architecture of the attention-based multimodal fusion RNN 599 used by RNN position estimator(s) 135 of some embodiments. The network 599 includes a set of encoding subnetworks 510, 515, 516, and 517. There is one encoding subnetwork for each satellite, i.e., for phase measurements from each satellite. The objective of encoding subnetworks is to weight the corresponding phase measurements to account for a likelihood of those measurements by multipath or LOS measurements. For example, the weights can be proportional (linearly or nonlinearly) to likelihood of phase measurements to represent LOS signal.

The network 599 also includes a position estimator subnetwork 555 trained to estimate position 557 based on the jointly weighted sums of phase measurements produced by encoding subnetworks 510, 515, 516, and 517. Notably, the subnetworks 510, 515, 516, 517, and 555 are part of the same neural network 599, and, thus, can be trained together to encode reliability of the signal separately, while determining the position jointly. In some implementations, the encoding subnetworks are trained for specific satellites. The configuration parameters 133 stores the correspondence, such that during the operations, a specific encoding subnetwork trained for a specific satellite received the phase measurements of that specific satellite. For example, for a specific satellite, the time series of phase measurements are stored in memory, e.g., are used as inputs to Long Short-Term Memory (LSTM). After then, individually compute the satellite dependent alpha attention vector or the set of satellite dependent attention weights. Accordingly, the RNN 599 applies different joint weights, i.e., attention, to at least some different phase measurements to produce a set of weighted phase measurements and determine the position of the vehicle from the set of individually weighted phase measurements, i.e., a multimodal fusion where the joint weights from different satellites represent different modalities. In such a manner, the RNN is trained to minimize, e.g., using weights, the negative impact of the multipath transmission on position estimation.

In the structure of the RNN, some embodiments use an end-to-end trained neural network not only for multipath estimation but also for position estimation. Thus, the training is accomplished end-to-end for the entire model, including the encoder and decoder (position estimator), and all the satellites' signals in view at the particular location and time, as opposed to training each satellite separately. This is beneficial of the generating a robust position estimation in the presence of multipath by applying a different attention to a satellite involved differently in the joint position estimation process.

Figure 5B:
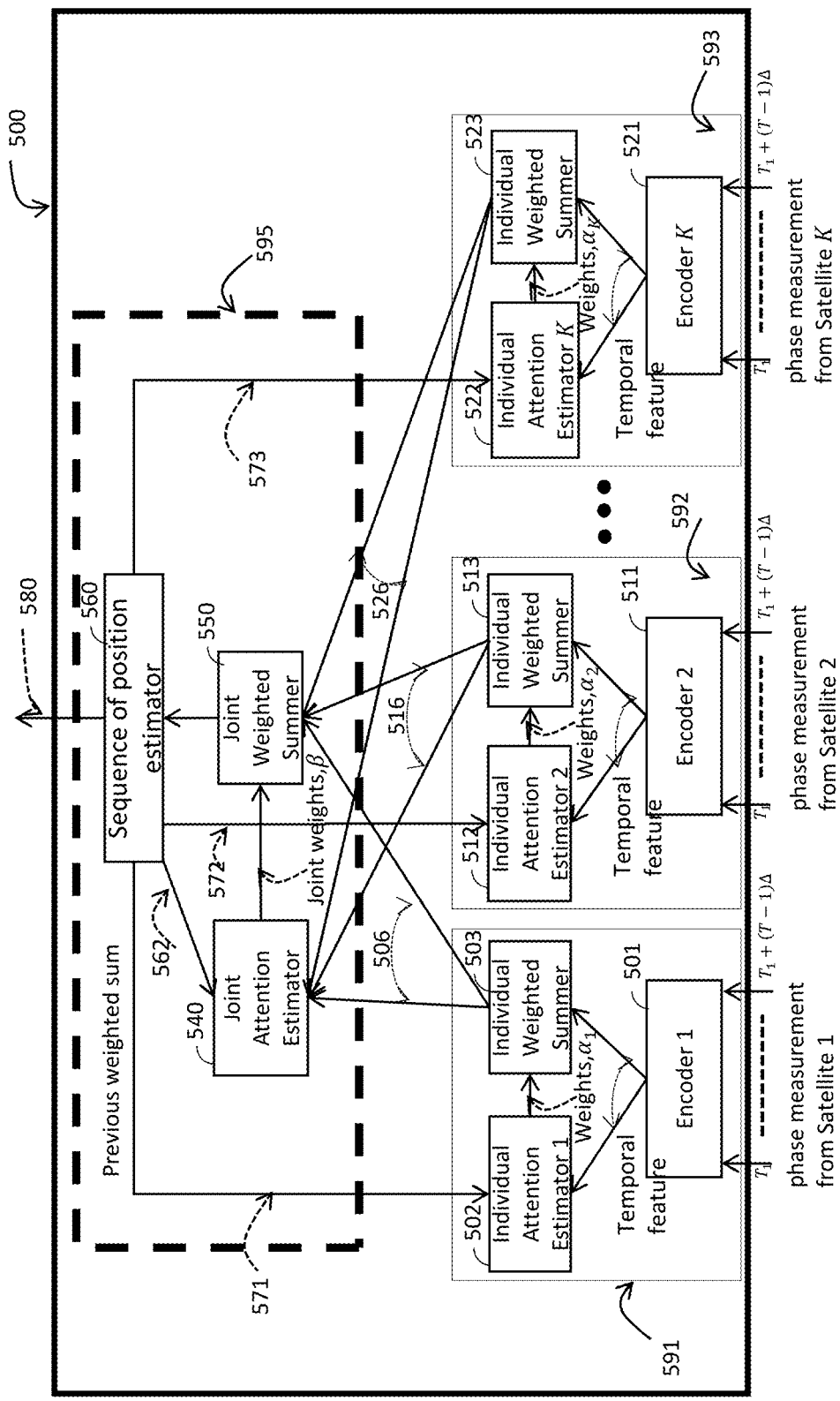
FIG. 5B shows a block diagram of an attention-based multimodal fusion architecture to perform position estimation in response to receiving the set of phase measurements according to one embodiment.

FIG. 5B shows a block diagram of an attention-based multimodal fusion architecture of RNN 500 to perform position estimation in response to receiving the set of phase measurements according to one embodiment. This embodiment uses the temporal attention-based RNN for the position estimation, 500, which is composed of blocks, 591,592,593, and 595. This embodiment also uses two-layer processing. The first layer includes different processes 591,592, and 593 connected to the input measurements from corresponding satellite signals. The second layer 595 processes the individually weighted sum outputted from the first layer. By applying temporal attention-based RNN, a non-linear and unbeknownst temporal dependencies in the series of satellite dependent phase measurements can be extracted, and then its effects on the position estimation is evaluated at the second layer process. Thus, a non-linear and unbeknownst temporal dependency in determining the position can be effectually exploited throughout satellites and sets of phase measurements.

The inputs and outputs of the RNN 500, are T GNSS phase measurements from K satellites, position estimation, 580, and previous individually weighted sums, 571,572, and 573, which are being used by blocks, 591,592, and 593. Blocks, 591, 592, and 593, are satellite dependent, that is, each block is related with only one satellite. In the first layer, each block includes an LSTM-based encoder, such as encoder 501, 511, and 521, attention estimator, such as estimators 502, 512, and 522, and individual weighted summers, such as 503, 513, and 523. Each attention estimator generates weights $\alpha_1, \alpha_2, \ldots, \alpha_K$, which are being used by corresponding individual weighted summers 503, 513, and 523.

The second layer block, 595, is for the LSTM-based decoding process of the temporal attention-based RNN. From the blocks, 591, 592, and 593, blocks 540 and 550 receive outputs of the individual weighted summers 503, 513, and 523 and then apply the decoding process for the position estimation, 560, for instance, $\hat{P}(T_1)$. Block 595 includes a joint attention estimator, 540, a joint weighted summer, 550, and sequence of position estimator, 560. The outputs of the joint attention estimation are the joint weights, $\beta$, which are used by the joint weighted summer block, 550. Each of the blocks, 591, 592, and 593, can be trained such that $\alpha_k$ indicates a set of individual weights for the time series of phase measurements and $\beta$ indicates joint weights corresponding to attention for different individually weighted sum of input phase measurements. Thus, $\beta$ indicates the set of adaptive joint weights. Then, the decoder inside of 560 estimates the position as outputs, 580, based on the joint weight vector $\beta$. Thus, different weights are expected for $\alpha_k$s.

In some implementations, the neural network 500 is trained for extracting or learning the satellite dependent temporal dependencies from the satellite dependent set of phase measurements. Typically, the type of the temporal dependencies is hidden and learned by the network during the training. This learning or feature extraction is implemented in a hidden layer H by encoders 510, 511, and 521 designed to extract hidden temporal dependencies of the phase measurements of each satellite. Those temporal dependencies help to exploit dynamic nature of phase measurement in distinguishing multipath from LOS signals.

Next, the neural network 500 is trained to estimate the individual, i.e., satellite dependent, set of individual weights. The individual weights are determined from the satellite dependent temporal dependencies determined by the encoder and dependencies of previously determined position estimates 571, 572, and 573. The individual weights are determined by the individual attention estimator, 502, 512, and 522. The individual weights are outputted to the corresponding individual weighted summers, 503, 513, and 523.

The individual weighted summers weights the features of the encoders with the determined weights and output weighted sums of the features to the second layer block 595.

Such a weighting process is repeated on a global level, i.e., for joint satellite measurements. The individually weighted sums, 506,516, and 526, from each satellite are submitted to the joint attention estimator 540 of the second layer 595 and to the joint weighted summer 550 of the second layer 595. The joint attention estimator 540 weights the individually weighted sums, 506, 516, and 526, from each satellite using the features of previously determined position estimates 562 allowing the joint weighted summer 550 to weight again the outputs 506, 516, and 526 from each satellite using those weights. In such a manner, the weights or attention of each satellite are evaluated twice. First individually, and second jointly. This evaluation reflects the nature of the multipath in position estimation discussed before, i.e., multipath is an individual process, while position estimation is a joint process. Next, the position estimates 580 are generated 560 from the outputs of the joint weighted summer 550.

Encoder-Decoder-Based Estimator for the Sequence of Position Estimate

Some embodiments are for the training the RNN for position estimation based on sequence-to-sequence learning. The input sequence, i.e., GNSS phase measurement, is first encoded. Then the output sequence, i.e., position estimate, is generated. In one simple embodiment, both the encoder and the decoder (position estimator) are modeled as LSTM networks.

Figure 6:
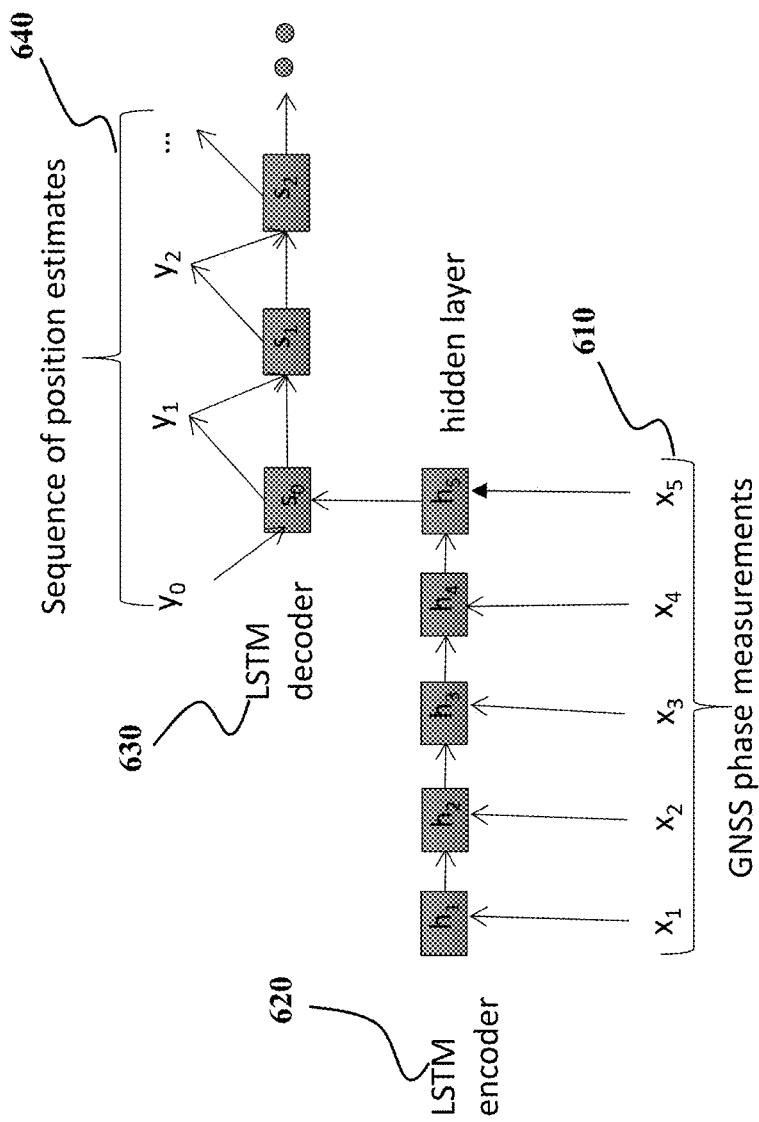
FIG. 6 shows a block diagram of the LSTM-based encoder-and-decoder architecture used by some embodiments.

FIG. 6 shows an example of the LSTM-based encoder-decoder architecture used by some embodiments. The sequence of GNSS phase measurement, $X=x_1, x_2, \ldots, x_L$, 610, is fed to the LSTM encoder 620, and the hidden states of the LSTM encoder 620 are expressed by $$h_t = \text{LSTM}(h_{t-1}, x_t; \lambda_E), \quad (1)$$

where the LSTM function of the encoder network $\lambda_E$ is computed as follows:

$$\text{LSTM}(h_{t-1}, x_t; \lambda) = o_t \tan h(c_t), \quad (2)$$

where $$o_t = \sigma(W_{xo}^{(\lambda)} x_t + W_{ho}^{(\lambda)} h_{t-1} + b_o^{(\lambda)}), \quad (3)$$

$$c_t = f_t c_{t-1} + i_t \tan h(W_{xc}^{(\lambda)} x_t + W_{hc}^{(\lambda)} h_{t-1} + b_c^{(\lambda)}), \quad (4)$$

$$f_t = \sigma(W_{xf}^{(\lambda)} x_t + W_{hf}^{(\lambda)} h_{t-1} + b_f^{(\lambda)}), \quad (5)$$

$$i_t = \sigma(W_{xi}^{(\lambda)} x_t + W_{hi}^{(\lambda)} h_{t-1} + b_i^{(\lambda)}), \quad (6)$$

where $\sigma(.)$ is the element-wise sigmoid function, and $i_t$, $f_t$, $c_t$ are, respectively, the input gate, forget gate, output gate, and cell activation vectors for the tth input vector. The weight matrices $W_{zz}^{(\lambda)}$ and the bias vectors $b_z^{(\lambda)}$ are identified by the subscript $z \in \{x, h, i, f, o, c\}$. For example, $W_{hi}$ is the hidden-input gate matrix and $W_{xo}$ is the input-output gate matrix. In some implementations, the peephole connections are not used.

The LSTM decoder 630 estimates the position 640 sequentially. Given decoder state $s_{i-1}$, the decoder network $\lambda_D$ infers the next position probability distribution as $$P(y|s_{i-1}) = \text{softmax}(W_s^{(\lambda, D)} s_{i-1} + b_s^{(\lambda, D)}), \quad (7)$$

and generates estimate $y_i$, which has the highest probability, according to $$y_i = \underset{y \in V}{\operatorname{argmax}} P(y \mid s_{i-1}), \quad (8)$$

where V denotes the searching range for the position. The decoder state is updated using the LSTM network of the decoder as $$s_i = \text{LSTM}(s_{i-1}, y_i; \lambda_D), \quad (9)$$

where the initial state $s_0$ is obtained from the final encoder state $h_L$ and $y_0$.

In the training phase, a set of $Y=y_1, \ldots, y_M$, 640, is given as the reference.

Attention-Based Estimator for the Sequence of Position Estimate

Some embodiments use an attention-based estimator, which enables the network to emphasize multipath from specific times or spatial regions depending on the instantaneous multipath, enabling the next position estimate to be predicted more accurately. The attention-based estimator can exploit input phase measurements selectively according to the input and output relationship.

Figure 7A:
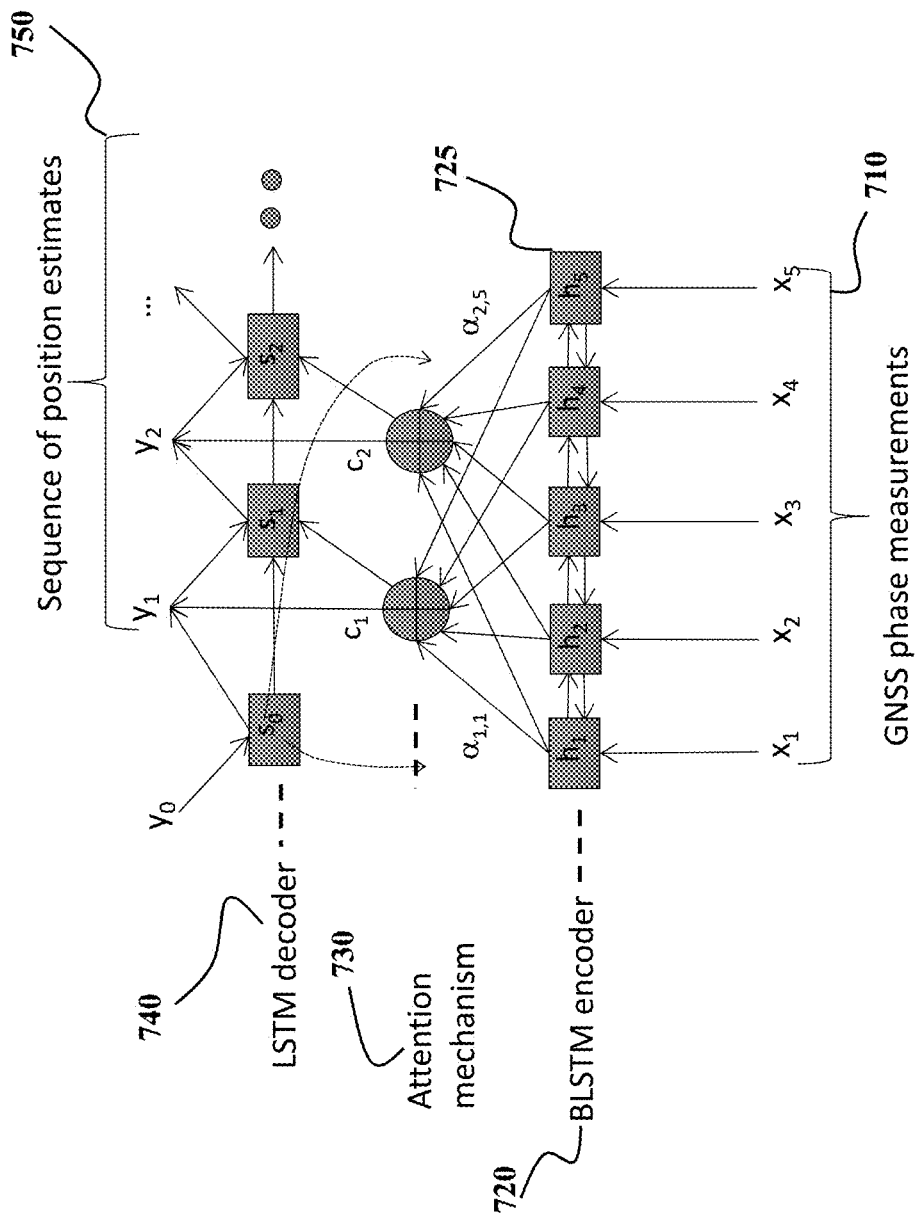
FIG. 7A is a block diagram of an example of the attention-based estimator according to some embodiments.

FIG. 7A is a block diagram of an example of the attention-based estimator according to some embodiments. In this example, the attention-based estimator has a temporal attention mechanism over the input phase measurements improving its ability to use dynamic information, and to learn temporal dependencies of phase measurements 710 acquired over time. In different embodiments, the attention-based estimator employs an encoder based on a bidirectional LSTM (BLSTM) or Gated Recurrent Units (GRU), so that each vector contains its individually weighted sum information.

When a BLSTM encoder 720 is used, then the activation vectors 725 (i.e., encoder states) can be obtained as $$h_t = \begin{bmatrix} h_t^{(f)} \\ h_t^{(b)} \end{bmatrix}, \quad (10)$$

where $h_t^{(f)}$ and $h_t^{(b)}$ are the forward and backward hidden activation vectors $$h_t^{(f)} = \text{LSTM}(h_{t-1}^{(f)}, x_t; \lambda_E^{(f)}) \quad (11)$$

$$h_t^{(b)} = \text{LSTM}(h_{t+1}^{(b)}, x_t; \lambda_E^{(b)}). \quad (12)$$

If a feed-forward layer is used, then the activation vector is calculated as $$h_t = \tan h(W_p x_t + b_p), \quad (13)$$

where $W_p$ is a weight matrix and $b_p$ is a bias vector.

The attention mechanism 730 is implemented by using temporal attention weights, $\alpha_{i,j}$, to the hidden activation vectors throughout the input measurements. These weights enable the network to emphasize inputs from those time steps that are most important for predicting the next position estimate.

Let $\alpha_{i,t}$ be a temporal attention weight between the ith output and the tth input. Accordingly, the ith output applying the attention mechanism is evaluated as a weighted sum of hidden unit activation vectors:

$$c_i = \sum_{t=1}^{L} \alpha_{i,t} h_t. \quad (14)$$

The decoder network 740 is an attention-based Recurrent Sequence Generator (ARSG) that generates an output sequence with content vectors $c_i$. The network also has an LSTM decoder network, where the decoder state can be updated in the same way as (9). Then, the probability of an estimate y is computed as $$P(y \mid s_{i-1}, c_i) = \text{softmax}(W_s^{(\lambda_D)} s_{i-1} + W_c^{(\lambda_D)} c_i + b_s^{\lambda_D}), \quad (15)$$

and position estimate $y_i$ 750 is generated according to $$y_i = \underset{y \in V}{\operatorname{argmax}} P(y \mid s_{i-1}, c_i). \quad (16)$$

In contrast to Eqs. (7) and (8) of the encoder-decoder, the probability distribution is conditioned on $c_i$, which emphasizes instantaneous multipath that are most relevant to a position estimate. In some embodiments, additional feed-forward layer is inserted before the softmax layer. In this case, the probabilities are computed as follows:

$$g_i = \tan h(W_s^{(\lambda_D)} s_{i-1} + W_c^{(\lambda_D)} c_i + b_s^{(\lambda_D)}), \quad (17)$$

$$P(y \mid s_{i-1}, c_i) = \text{softmax}(W_g^{(\lambda_D)} g_i + b_s^{(\lambda_D)}). \quad (18)$$

The temporal attention weights are computed as $$\alpha_{i,t} = \frac{\exp(e_{i,t})}{\sum_{\tau=1}^{L} \exp(e_{i,\tau})} \quad (19)$$

with $$e_{i,t} = w_A^T \tanh(W_A s_{i-1} + V_A h_t + b_A), \quad (20)$$

where $W_A$ and $V_A$ are matrices, $W_A$ and $b_A$ are vectors, and $e_{i,t}$ is a scalar.

Attention-Based Multimodal Estimator

Some embodiments of the present disclosure provide an attention model to handle the mixture of multiple modalities, where each modality has its own sequence of GNSS phase measurements. Although multipath is an individual process, i.e., multipath caused by one particular satellite signal is independent from other satellites' signals, for instance, 228 vs. 230, the position estimation is a joint process since at least four satellites' signals are required.

Figure 7B:
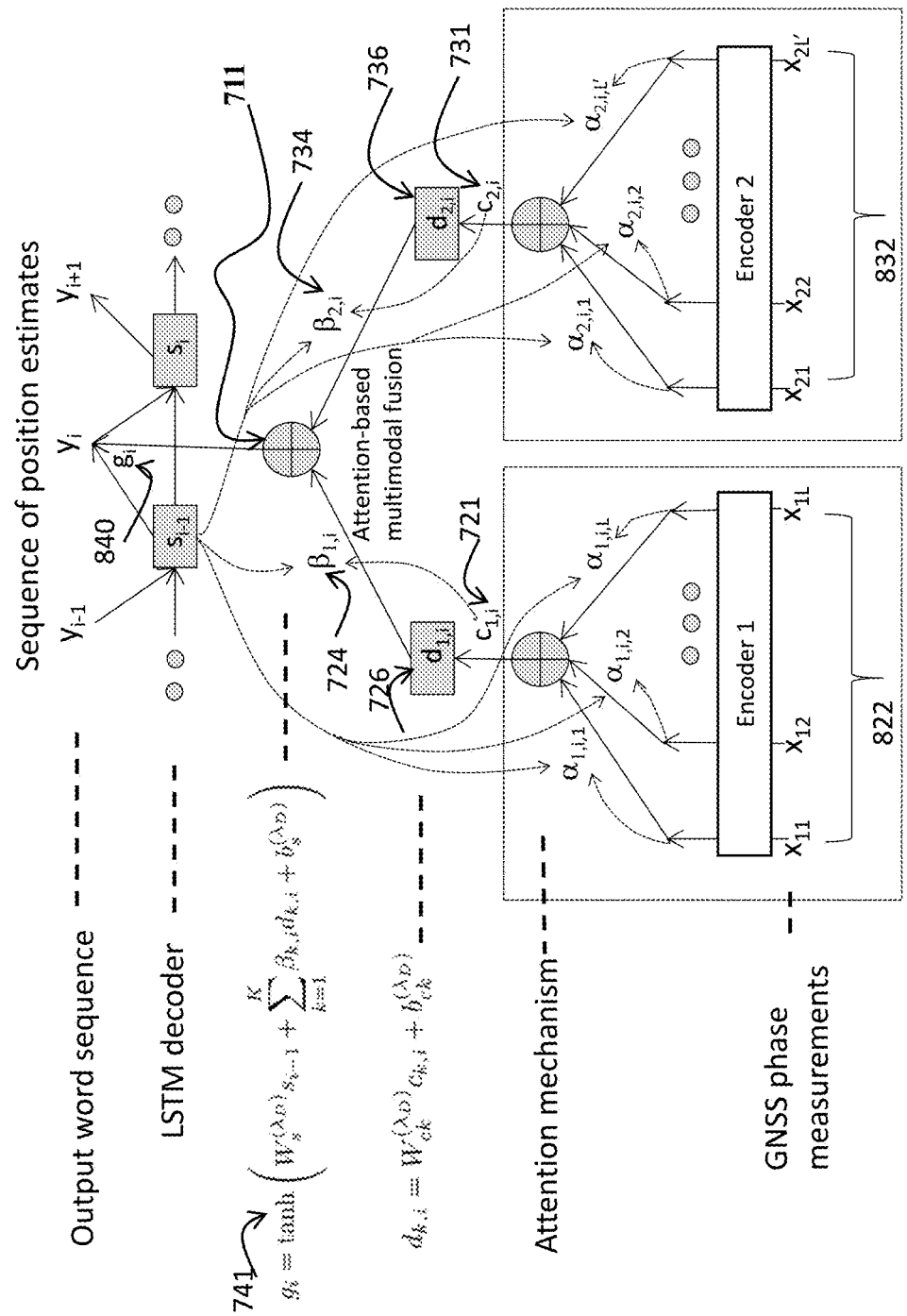
FIG. 7B shows a schematic of a multimodal estimator used by some embodiments.

FIG. 7B shows a schematic of a multimodal estimator used by some embodiments. Let K be the number of modalities, i.e., the number of satellites in view. Then the multimodal fusion 711 of the multimodal estimator computes following activation vector, 741, $$g_i = \tanh\left(W_s^{(\lambda_D)} s_{i-1} + \sum_{k=1}^{K} \beta_{k,i} d_{k,i} + b_s^{(\lambda_D)}\right), \quad (21)$$

where $$d_{k,i} = W_{ck}^{(\lambda_D)} c_{ki} + b_{ck}^{(\lambda_D)}, \quad (22)$$

are computed at 826 and 836, and $\{c_{ki}\}$, 820 and 830, is the set of content vectors with $c_{ki}$, denoting the kth content vector corresponding to the kth modality.

In the multimodal estimator of FIG. 7B, the content vectors, $c_{1,i}$, 721, and $c_{2,i}$, 731, are obtained with temporal attention weights for individual input sequences $x_{1,1}, \ldots,$ $x_{1,L}$, 722, and $x_{2,1}, \ldots, x_{2,L}$, 732, respectively. For instance, $c_{1,i} = \Sigma_{t=1}^{L} \alpha_{1,i,t} x_{1,t}$. However, these content vectors are combined with weight matrices $W_{c1}$ and $W_{c2}$. Based on the current decoder state and the content vectors, the decoder network can selectively attend to specific modalities of input to predict the next position estimate.

The multimodal attention weights $\beta_{k,i}$, 724 and 734, are obtained in a similar way to the temporal attention mechanism as follows:

$$\beta_{k,i} = \frac{\exp(v_{k,i})}{\sum_{\tau=1}^{K} \exp(v_{\tau,i})}, \quad (23)$$

with $$v_{k,i} = w_B^T \tanh(W_B s_{i-1} + V_{Bk} c_{k,i} + b_{Bk}), \quad (24)$$

where $W_B$ and $V_{Bk}$ are matrices, $w_B$ and $b_{Bk}$ are vectors, and $v_{k,i}$ is a scalar.

Figure 8A:
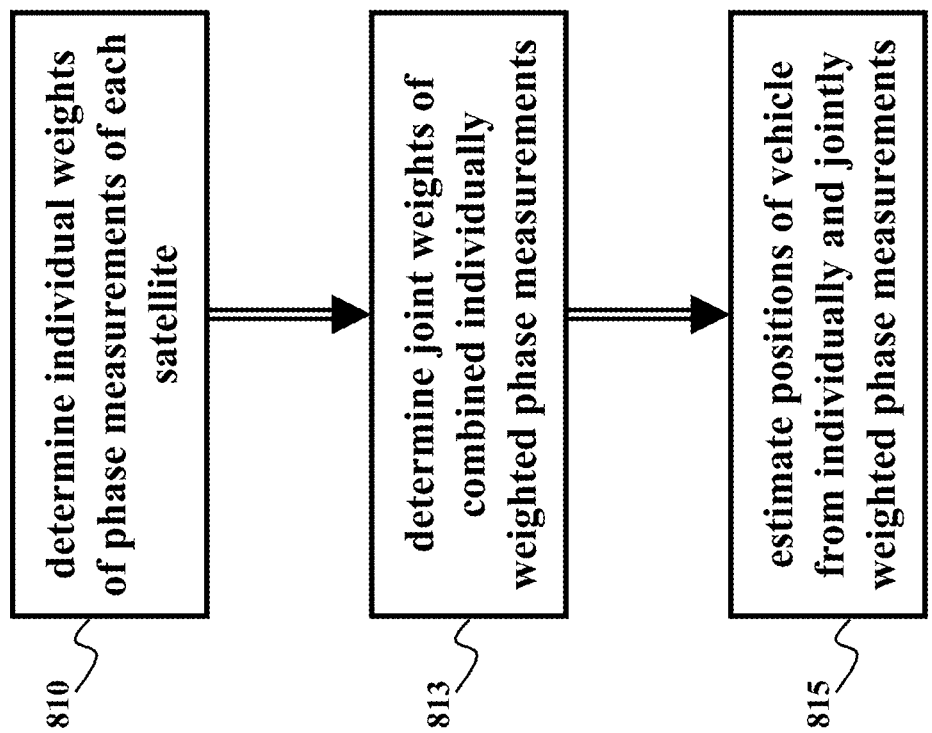
FIG. 8A is a flowchart shows the basic procedure in position estimation of vehicle from the set of satellite dependent measurements according to some embodiments.

FIG. 8A shows a block diagram of a method for position estimation performed by a RNN according to some embodiments. The RNN is trained to determine 810 individual or temporal attention weights, $\alpha_1, \ldots, \alpha_K$ from FIG. 5B, of phase measurements of each satellite based on current and previous temporal features of the phase measurements of the satellite. For example, these current features are the outputs from Encoders, 501, 511, and 521. The previous temporal features of the phase measurements correspond 571, 572, and 573, which are the outputs from 560. This processing can be described by Equations (19) and (20).

The RNN is trained to determine 813 joint weights or multimodal attention weights, $\beta$, at 540 of combined individually weighted phase measurements, 506, 516, and 526, of the multiple satellites based on previous joint weights, 562. This processing can be described by Equations (23) and (24).

The RNN is trained to estimate 815 the position of the vehicle from the combined individually weighted phase measurements that are weighted with the joint weights. For example, this is accomplished by similar processing described by Equations (7) and (8). That is, for the activation vector, $g_i$, described by Equation (21), apply Equation (7) and (8). Then, $y_i$ corresponds to the estimate of the vehicle position.

Figure 8B:
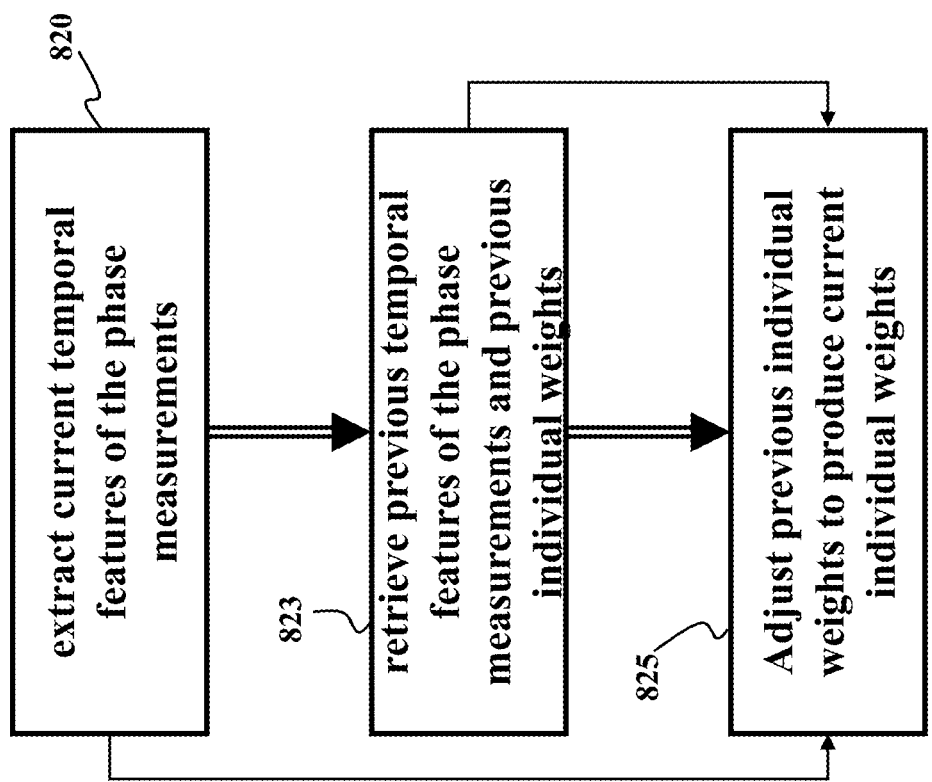
FIG. 8B is a flowchart shows the basic procedure in the computation of individual weights according to some embodiments.

FIG. 8B shows a block diagram of a method for determining individual weights, $\alpha_1, \alpha_2, \ldots, \alpha_K$, at 502, 512, and 522, according to one embodiment. In this embodiment, the RNN is further trained to extract 820 current temporal features of the phase measurements of the satellite from a sequence of phase measurements collected over a current window of time.

The RNN is trained to retrieve 823 previous temporal features of the phase measurements of the satellite determined for a sequence of phase measurements collected over a previous window of time and individual weights determined for the previous temporal features. For example, this is the processing that can be accomplished at 502, 512, and 522, for the inputs 571, 572, 573, which are the outputs from 560.

The RNN is trained to determine 825 the individual weights for the current temporal features by adjusting the individual weights determined for the previous temporal features based on comparison of the current temporal features with the previous temporal features. For example, this is the processing accomplished by 502, 512, and 522.

Figure 8C:
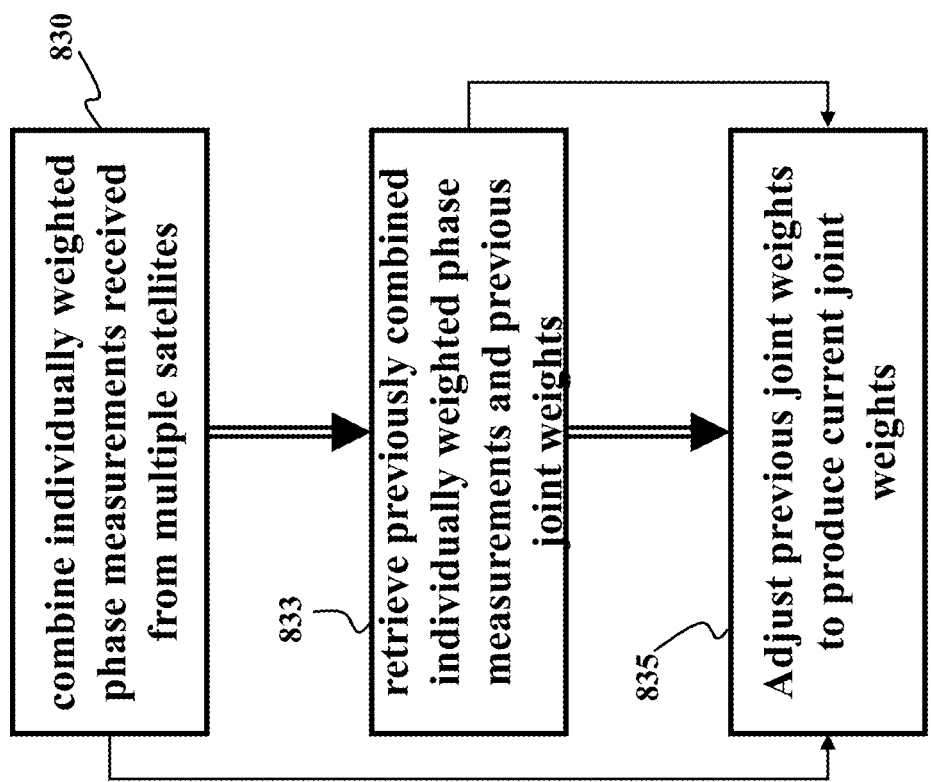
FIG. 8C is a flowchart shows the updating procedure of joint weights or multimodal attention weights according to some embodiments.

FIG. 8C shows a block diagram of a method for determining joint weights, $\beta$, according to one embodiment. In this embodiment, the RNN is further trained to combine 830 the individually weighted phase measurements, 503, 513, and 523, received from the multiple satellites, over a current window of time to produce the combined individually weighted phase measurements at the joint weighted summer, 550, for the current window of time.

The RNN is trained to retrieve 833 previously combined individually weighted phase measurements determined for a previous window of time. For example, this can be accomplished at the joint attention estimator, 540, with respect to the input 562, the output from 560. The RNN is trained to retrieve 833 previous joint weights determined for the previously combined individually weighted phase measurements. Further, the RNN is trained to determine the joint weights by adjusting 835 previous joint weights based on comparison of the combined individually weighted phase measurements and the previously combined individually weighted phase measurements.

Some embodiments, in order to train a RNN, use data relating the phase measurements with position estimation determined from the clean signal free of multipath. Some embodiments are based on recognition that log files of various commercially available navigators can provide such data. To that end, some embodiments train the RNN with information extracted from those log files. The embodiments allow using different log files of the same or different routes collected from the same or different navigators to train the RNN offline. Some possible data formats in those log files relate path in klm to latitude and longitude of the position.

However, through experimentation and testing, some embodiments are based on understanding that training of the RNN is very data demanding task. Specifically, in contrast with classification task of the neural network aimed to classify the input, such as noise and not noise, the position estimation is a numerical problem requiring much more data for the training than the classification tasks. In some embodiments, this problem is overcome by spending more time on training the RNN. Additionally, or alternatively, in some embodiments, this problem is overcome by reducing an area where the RNN is trained to perform the position estimation.

For example, in one embodiment, the RNN is trained for a specific path, such that the processor tracks the position of the vehicle traveling along at least a portion of the specific path. In such a manner, the neural network is trained for the path with data collected from traveling along that path, which reduce the amount of data sufficient to train the RNN. For some applications, this limitation is not even a problem. For example, trains travel along the predetermined paths, and some embodiments use the RNN trained to determine the position of a train traveling along a specific path.

Figure 9A:
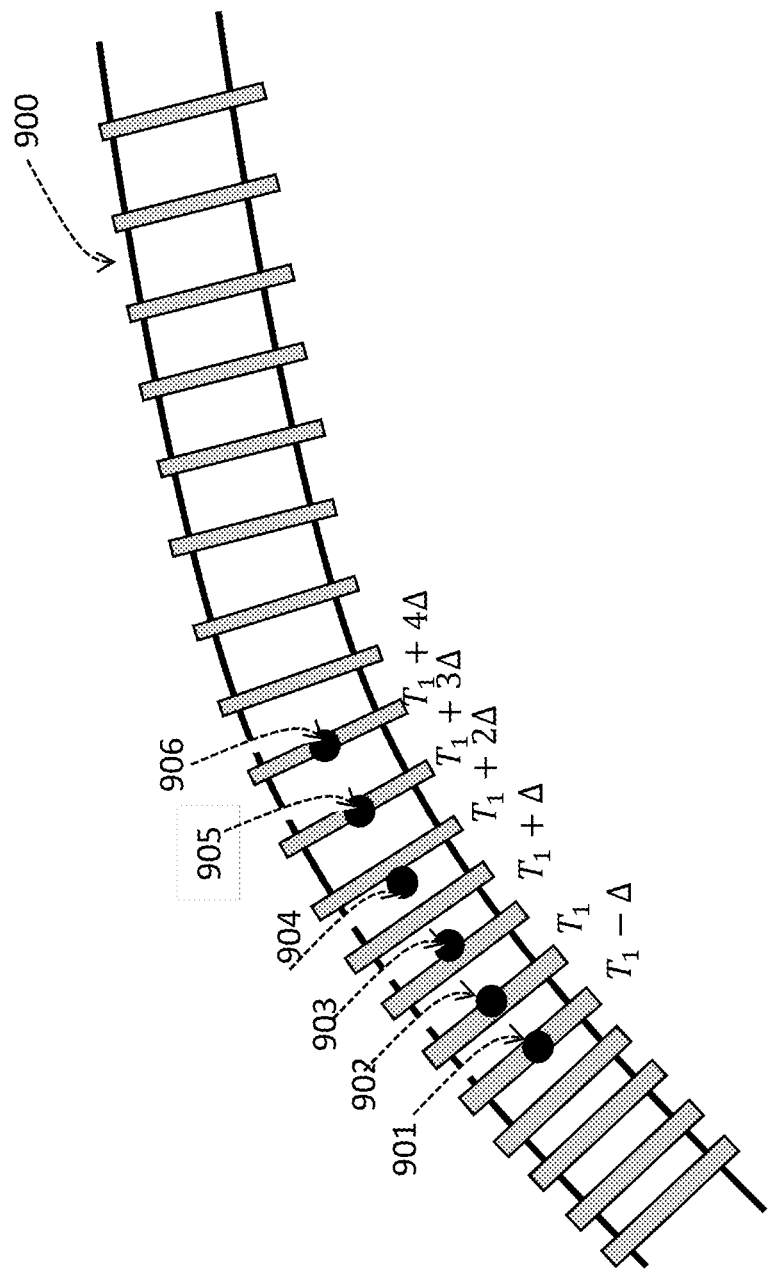
FIG. 9A shows a schematic of a rail track defining a particular path, 900, used by some embodiments to train a neural network for position estimation along this path.

FIG. 9A shows a schematic of a rail track defining a particular path 900 used by some embodiments to train a neural network for position estimation along this path 900. For a particular path, 900, some embodiments obtain a log file with phase measurements for specific positions 901, 902, 903, 904, 905, and 906 along the path. Using this information from the log file, the embodiments train the neural network for estimating the positon along the specific path. Such a training reduces dimensionality and increase the accuracy of position estimation.

Additionally, or alternatively, some embodiments use multiple RNNs trained for different paths. Those embodiments add a flexibility in the position estimation, because a different RNN can be trained and updated separately, i.e., independently from each other.

Figure 9B:
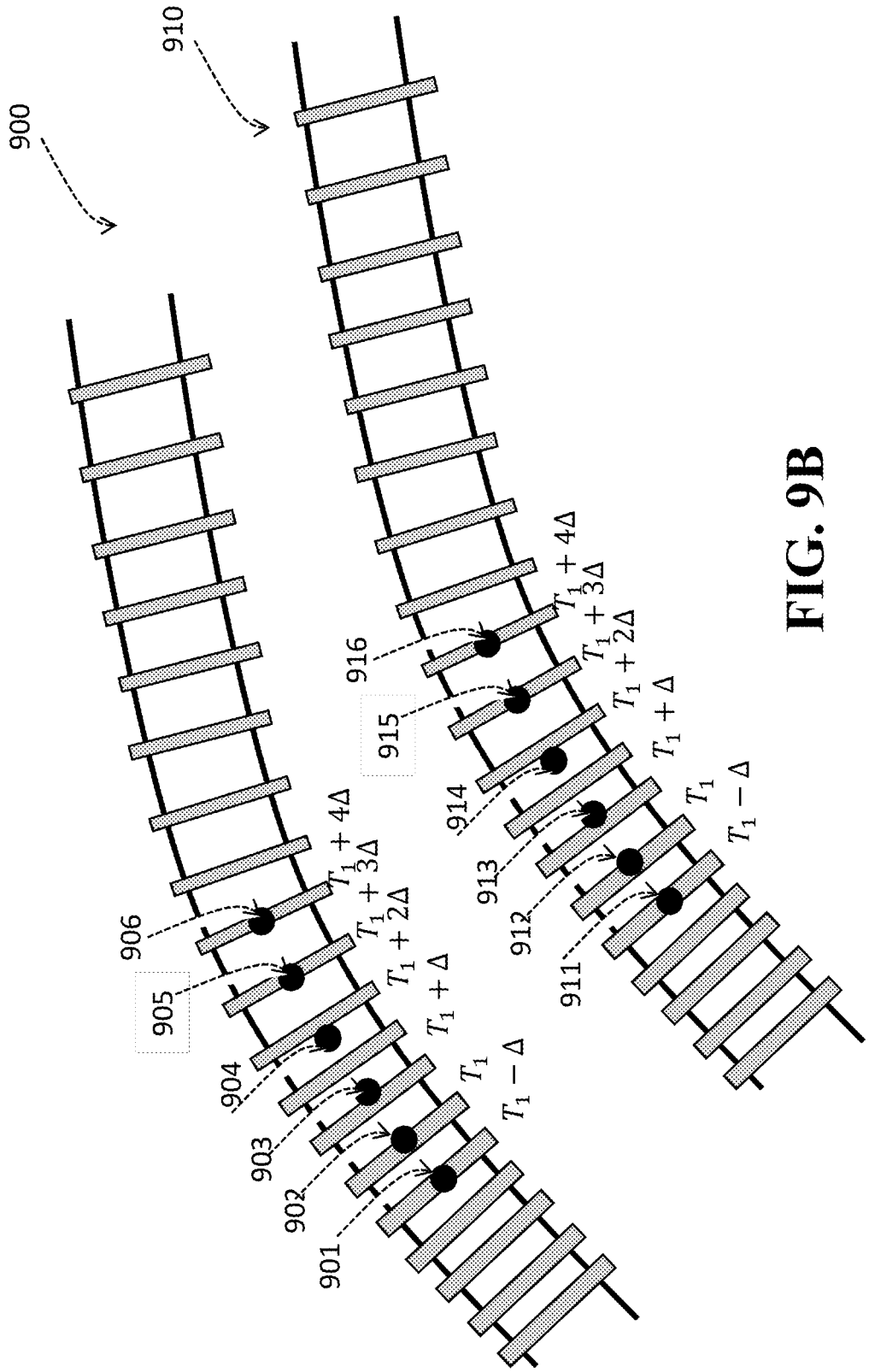
FIG. 9B shows a schematic of multiple rail tracks defining multiple paths used by some embodiments to train multiple neural network for position estimation along multiple paths.

FIG. 9B shows a schematic of multiple rail tracks defining multiple paths 900 and 910 used by some embodiments to train multiple neural network for position estimation along multiple paths 900 and 910. These embodiments obtain the log file for specifying 901, 902, 903, 904, 905, and 906 positions for the first track and a log file for specifying positions 911, 912, 913, 914, 915, and 916 for the second track. The embodiments can train each neural network for each path separately and select the needed neural network during the movement of a vehicle.

For example, in one embodiment, memory of the positioning system stores a set of RNNs, each of which is trained for a specific path, and the processor of the positioning system selects the RNN from the set of RNNs for the tracking. The configuration parameters 133 can be used to assist the network selection. Notably, one implementation of this embodiment allows using a different RNN from the set of RNNs during the tracking. Various methods can be used for selecting the current RNN from the memory. For example, one embodiment uses a coarse position estimation, and or current position from the tracking to select the current RNN.

Additionally, or alternatively, one embodiment performs online position estimation using various navigators and train the RNN using the log files of the utilized navigator until the trained RNN achieves the target accuracy of the position estimation. This embodiment allows to train the neural network for an arbitrarily path of a specific vehicle. For example, that path can be a path that the vehicle is usually follows, such as a path from home to work place, or a path from a storage warehouse to a delivery port.

Figure 10:
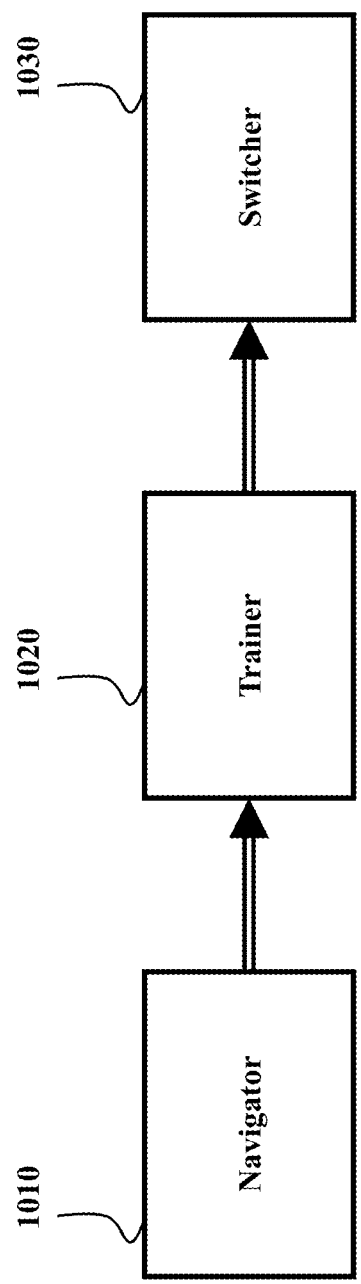
FIG. 10 shows a schematic of a positioning system adapted for online training of a RNN position estimator according to one embodiment.

FIG. 10 shows a schematic of a positioning system adapted for online training of a RNN position estimator 135 according to one embodiment. The embodiment includes a navigator 1010 configured to track the position of the vehicle to produce a log file including phase measurements and corresponding position estimates, a trainer 1020 configured to train the RNN using data extracted from the log file, and a switcher 1030 configured to switch the tracking from the navigator to the RNN when the RNN is trained.

Until the training is complete, the navigation of the vehicle is performed with navigator 1010. After the training, the switch 1030 changes the position estimating from the navigator to the RNN position estimator. Such a switching allows to reduce computational burden of position estimation. It also allows to remove the navigator and install it in other vehicles. It also allows to add trained neural network to a bank of neural networks.

Figure 11:
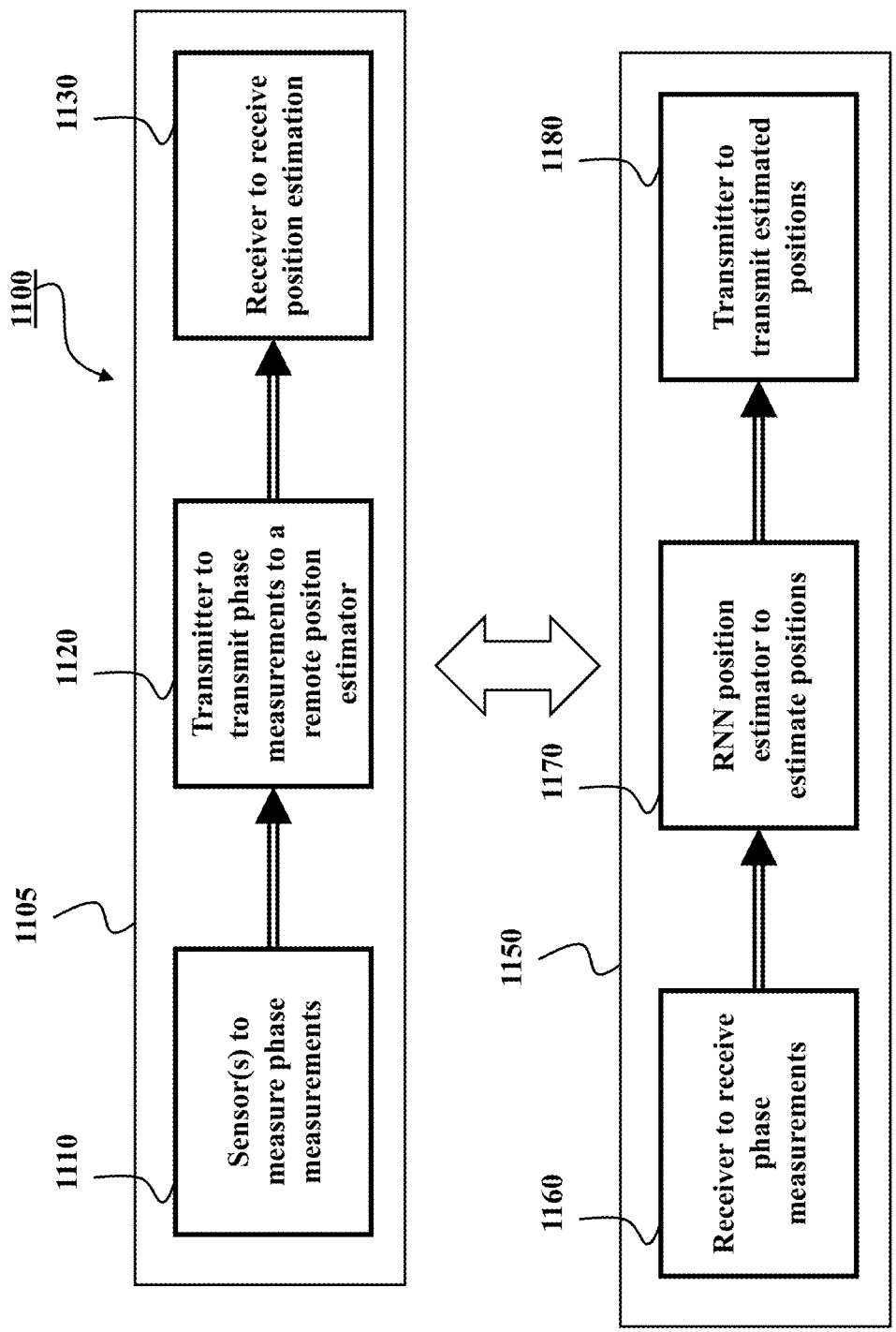
FIG. 11 shows a block diagram of a distributed position estimation system according to some embodiments.

FIG. 11 shows a block diagram of a distributed position estimation system 1100 according to some embodiments. These embodiments are based on realization that avoidance of separate multipath detection process makes the position estimation adaptable for distributed applications. For example, a client position estimator 1105 of the distributed position estimation system 1100 includes one or multiple sensors or GNSS receivers 110 to measure phase measurements, a transmitter 1120 to transmit phase measurements to a remote positon estimator 1150, and a receiver 1130 to receive position estimations from the remote positon estimator 1150.

Similarly, the remote positon estimator 1150 includes a receiver 1160 to receive phase measurements, a RNN position estimator 1170 to estimate the positions, and a transmitter 180 to transmit estimated positions back to the client position estimator.

Figure 12:
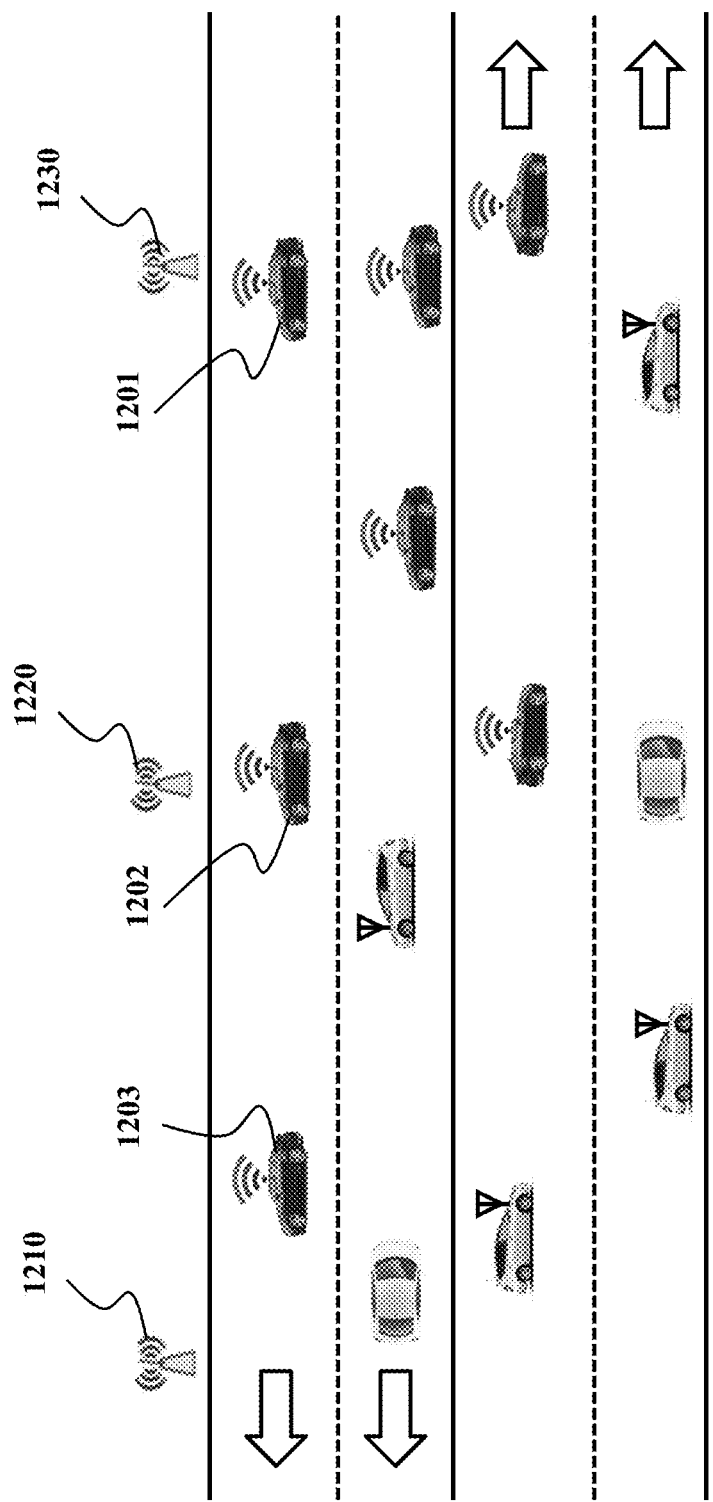
FIG. 12 shows a schematic of a distributed positioning system implemented over a vehicular network according to one embodiment.

FIG. 12 shows a schematic of a distributed positioning system implemented over a vehicular network according to one embodiment. In this embodiment, the vehicle, such as a vehicle 1201, 1202, 1203, in communication with an access point of the vehicular network, such as an access point 1230, 1220, and 1210. In such a manner, some elements of the positioning system can be implemented on a vehicle, and some elements can be implemented on an access point and/or other systems operatively connected to the access point. In this example, the vehicle 1201, 1202, 1203 can be different vehicles, or the same vehicle in different points of time.

For example, in one embodiment, the vehicle 1201 includes a transceiver to transmit the phase measurements to the access point 1230 and to receive estimates of the position of the vehicle from the access point. The position estimation is performed by the access point 1230 (and/or other systems operatively connected to the access point) and transmitted back to the vehicle. In such a manner, the RNN is stored in the memory of the access point and is trained to determine positions in an area of the vehicular network covered by the access point. When the vehicle moves between the areas covered by different access points, such as access points 1220 or 1210, unbeknownst to the vehicle, different access points track the position of the vehicle with different RNNs.

Figure 13:
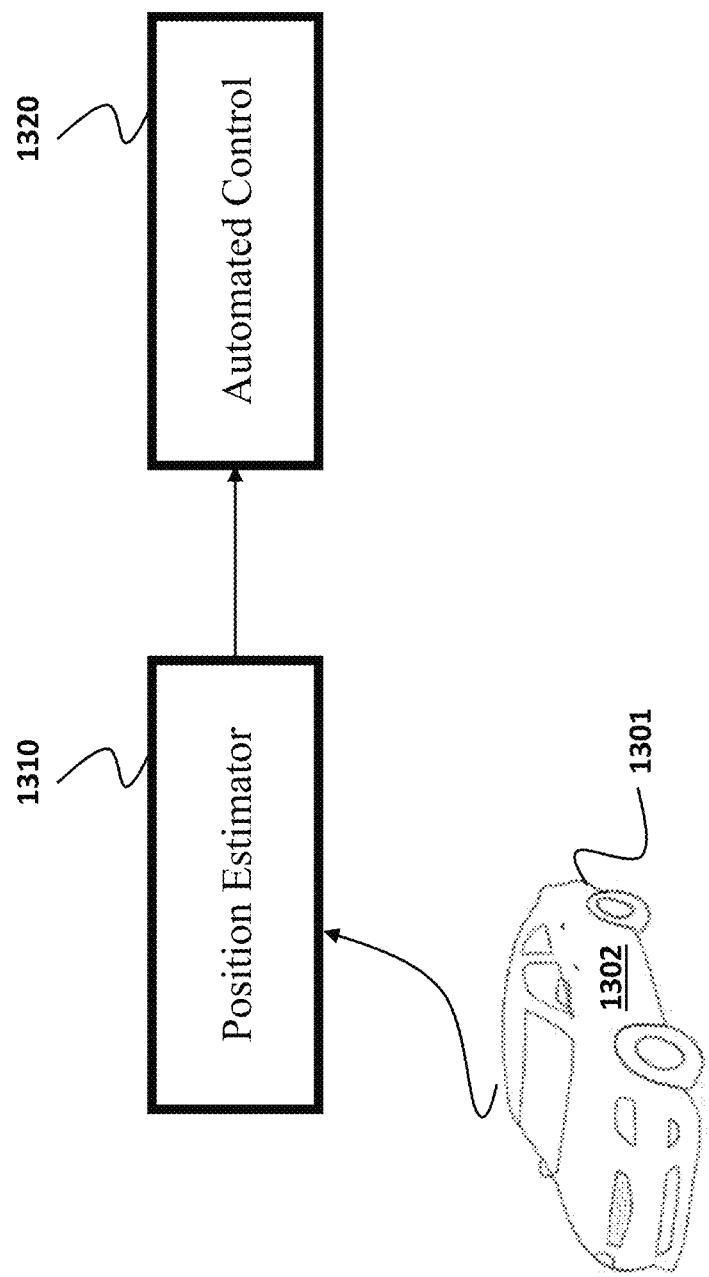
FIG. 13 shows a schematic of a vehicle employing position estimation system according to different embodiments.

FIG. 13 shows a schematic of a vehicle 1301 employing position estimation system 1310 according to different embodiments. The vehicle 1301 includes a processor 1302 configured for performing the position estimation 1310. In some embodiments, the processor 1302 is also configured to perform various control applications 1320 based on positions estimated by the position estimator 1310.

Figure 14:
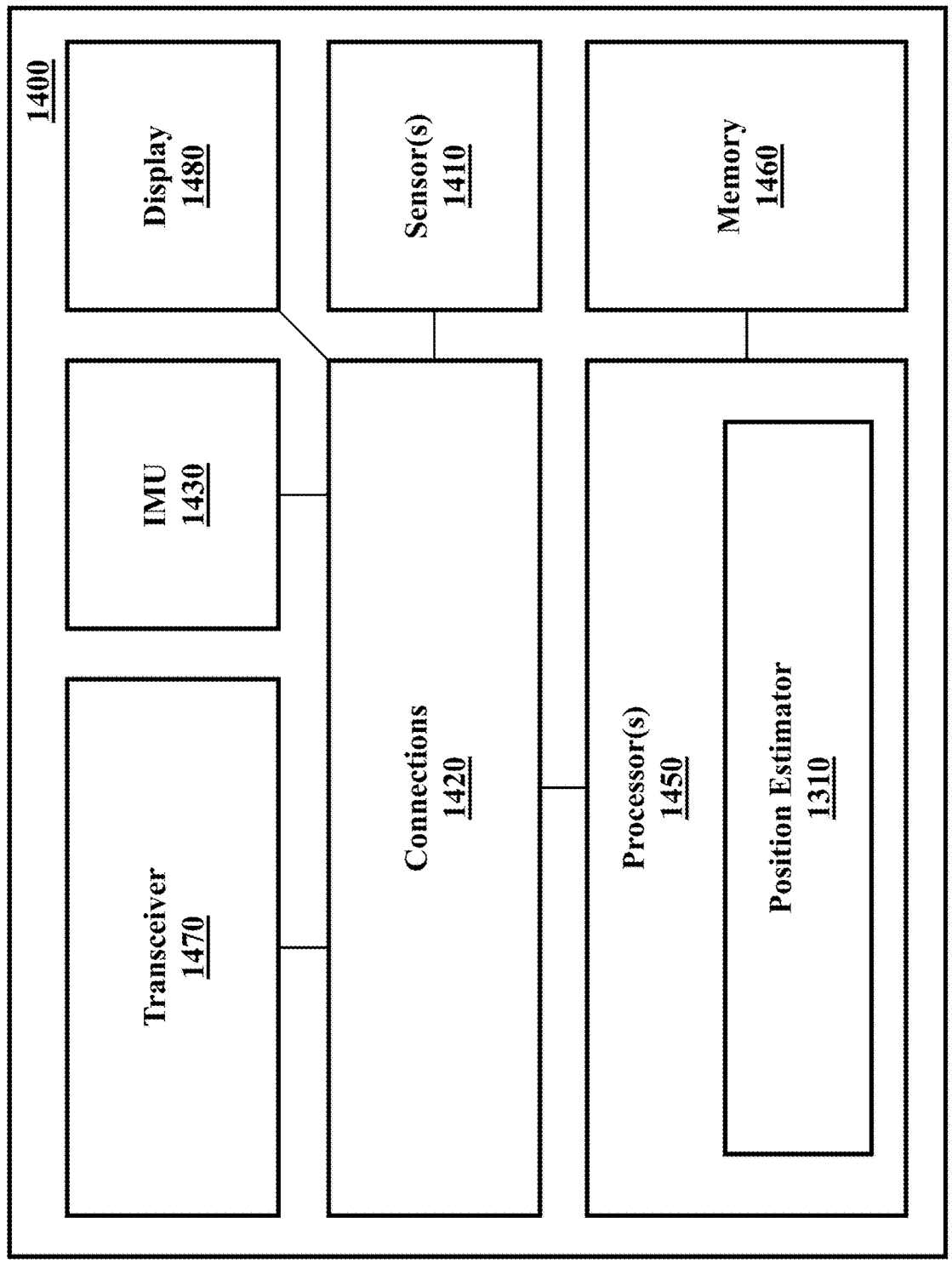
FIG. 14 shows a block diagram of a position estimation system according to some embodiments.

FIG. 14 shows a block diagram of a position estimation system 1400 according to some embodiments. The system 1400 can be implemented internal to the vehicle 1301. Additionally, or alternatively, the system 1400 can be communicatively connected to the vehicle 1301.

The system 1400 can include one or combination of a camera 1410, an inertial measurement unit (IMU) 1430, a processor 1450, a memory 1460, a transceiver 1470, and a display/screen 1480, which can be operatively coupled to other components through connections 1420. The connections 1420 can comprise buses, lines, fibers, links or combination thereof.

The transceiver 1470 can, for example, include a transmitter enabled to transmit one or more signals over one or more types of wireless communication networks and a receiver to receive one or more signals transmitted over the one or more types of wireless communication networks. The transceiver 1470 can permit communication with wireless networks based on a variety of technologies such as, but not limited to, femtocells, Wi-Fi networks or Wireless Local Area Networks (WLANs), which may be based on the IEEE 802.11 family of standards, Wireless Personal Area Networks (WPANS) such Bluetooth, Near Field Communication (NFC), networks based on the IEEE 802.15x family of standards, and/or Wireless Wide Area Networks (WWANs) such as LTE, WiMAX, etc. The system 400 can also include one or more ports for communicating over wired networks.

In some embodiments, the system 1400 can comprise image sensors such as CCD or CMOS sensors, lasers and/or camera 1410, which are hereinafter referred to as "sensor 1410". For example, the sensor 1410 can convert an optical image into an electronic or digital image and can send acquired images to processor 1450. Additionally, or alternatively, the sensor 1410 can sense the light reflected from a target object in a scene and submit the intensities of the captured light to the processor 1450.

For example, the sensor 1410 can include color or grayscale cameras, which provide "color information." The term "color information" as used herein refers to color and/or grayscale information. In general, as used herein, a color image or color information can be viewed as comprising 1 to N channels, where N is some integer dependent on the color space being used to store the image. For example, an RGB image comprises three channels, with one channel each for Red, Blue and Green information.

For example, the sensor 1410 can include a depth sensor for providing "depth information." The depth information can be acquired in a variety of ways using depth sensors. The term "depth sensor" is used to refer to functional units that may be used to obtain depth information independently and/or in conjunction with some other cameras. For example, in some embodiments, the depth sensor and the optical camera can be part of the sensor 1410. For example, in some embodiments, the sensor 1410 includes RGBD cameras, which may capture per-pixel depth (D) information when the depth sensor is enabled, in addition to color (RGB) images.

As another example, in some embodiments, the sensor 1410 can include a 3D Time of Flight (3DTOF) camera. In embodiments with 3DTOF camera, the depth sensor can take the form of a strobe light coupled to the 3DTOF camera, which can illuminate objects in a scene and reflected light can be captured by a CCD/CMOS sensor in the sensor 410. Depth information can be obtained by measuring the time that the light pulses take to travel to the objects and back to the sensor.

As a further example, the depth sensor can take the form of a light source coupled to the sensor 1410. In one embodiment, the light source projects a structured or textured light pattern, which can include one or more narrow bands of light, onto objects in a scene. Depth information is obtained by exploiting geometrical distortions of the projected pattern caused by the surface shape of the object. One embodiment determines depth information from stereo sensors such as a combination of an infra-red structured light projector and an infra-red camera registered to a RGB camera.

In some embodiments, the sensor 1410 includes stereoscopic cameras. For example, a depth sensor may form part of a passive stereo vision sensor, which may use two or more cameras to obtain depth information for a scene. The pixel coordinates of points common to both cameras in a captured scene may be used along with camera pose information and/or triangulation techniques to obtain per-pixel depth information.

In some embodiments, the system 1400 can be operatively connected to multiple sensors 1410, such as dual front cameras and/or a front and rear-facing cameras, which may also incorporate various sensors. In some embodiments, the sensors 1410 can capture both still and video images. In some embodiments, the sensor 1410 can include RGBD or stereoscopic video cameras capable of capturing images at, e.g., 30 frames per second (fps). In one embodiment, images captured by the sensor 1410 can be in a raw uncompressed format and can be compressed prior to being processed and/or stored in memory 1460. In some embodiments, image compression can be performed by the processor 1450 using lossless or lossy compression techniques.

In some embodiments, the processor 1450 can also receive input from IMU 1430. In other embodiments, the IMU 1430 can comprise 3-axis accelerometer(s), 3-axis gyroscope(s), and/or magnetometer(s). The IMU 1430 can provide velocity, orientation, and/or other position related information to the processor 1450. In some embodiments, the IMU 1430 can output measured information in synchronization with the capture of each image frame by the sensor 1410. In some embodiments, the output of the IMU 1430 is used in part by the processor 1450 to fuse the sensor measurements and/or to further process the fused measurements.

The system 1400 can also include a screen or display 1480 rendering images, such as color and/or depth images. In some embodiments, the display 1480 can be used to display live images captured by the sensor 1410, fused images, augmented reality (AR) images, graphical user interfaces (GUIs), and other program outputs. In some embodiments, the display 1480 can include and/or be housed with a touchscreen to permit users to input data via some combination of virtual keyboards, icons, menus, or other GUIs, user gestures and/or input devices such as styli and other writing implements. In some embodiments, the display 1480 can be implemented using a liquid crystal display (LCD) display or a light emitting diode (LED) display, such as an organic LED (OLED) display. In other embodiments, the display 480 can be a wearable display. In some embodiments, the result of the fusion can be rendered on the display 1480 or submitted to different applications that can be internal or external to the system 1400.

Exemplary system 1400 can also be modified in various ways in a manner consistent with the disclosure, such as, by adding, combining, or omitting one or more of the functional blocks shown. For example, in some configurations, the system 1400 does not include the IMU 1430 or the transceiver 1470. Further, in certain example implementations, the system 1400 include a variety of other sensors (not shown) such as an ambient light sensor, microphones, acoustic sensors, ultrasonic sensors, laser range finders, etc. In some embodiments, portions of the system 400 take the form of one or more chipsets, and/or the like.

The processor 1450 can be implemented using a combination of hardware, firmware, and software. The processor 1450 can represent one or more circuits configurable to perform at least a portion of a computing procedure or process related to sensor fusion and/or methods for further processing the fused measurements. The processor 1450 retrieves instructions and/or data from memory 1460. The processor 1450 can be implemented using one or more application specific integrated circuits (ASICs), central and/or graphical processing units (CPUs and/or GPUs), digital signal processors (DSPs), digital signal processing devices (DSPDs), programmable logic devices (PLDs), field programmable gate arrays (FPGAs), controllers, micro-controllers, microprocessors, embedded processor cores, electronic devices, other electronic units designed to perform the functions described herein, or a combination thereof.

The memory 1460 can be implemented within the processor 1450 and/or external to the processor 1450. As used herein the term "memory" refers to any type of long term, short term, volatile, nonvolatile, or other memory and is not to be limited to any particular type of memory or number of memories, or type of physical media upon which memory is stored. In some embodiments, the memory 1460 holds program codes that facilitate position estimation.

For example, the memory 1460 can store the measurements of the sensors, such as still images, depth information, video frames, program results, as well as data provided by the IMU 1430 and other sensors. The memory 1460 can store a memory storing a geometry of the vehicle, a map of the surrounding space, a kinematic model of the vehicle, and a dynamic model of the vehicle. In general, the memory 1460 can represent any data storage mechanism. The memory 1460 can include, for example, a primary memory and/or a secondary memory. The primary memory can include, for example, a random access memory, read only memory, etc. While illustrated in FIG. 14 as being separate from the processors 1450, it should be understood that all or part of a primary memory can be provided within or otherwise co-located and/or coupled to the processors 1450.

Secondary memory can include, for example, the same or similar type of memory as primary memory and/or one or more data storage devices or systems, such as, for example, flash/USB memory drives, memory card drives, disk drives, optical disc drives, tape drives, solid state drives, hybrid drives etc. In certain implementations, secondary memory can be operatively receptive of, or otherwise configurable to a non-transitory computer-readable medium in a removable media drive (not shown). In some embodiments, the non-transitory computer readable medium forms part of the memory 1460 and/or the processor 1450.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention.

Therefore, it is the object of the appended claims to cover all such variations and modifications as come within the true spirit and scope of the invention.

We claim:

1. A positioning system for tracking a position of a vehicle, comprising:
a receiver configured to receive phase measurements of satellite signals received at the vehicle at multiple instances of time from multiple satellites;
a memory configured to store a recurrent neural network trained to determine a position of the vehicle from a set of phase measurements in a presence of noise caused by a multipath transmission of at least some of the satellite signals at some instances of time; and
a processor configured to track the position of the vehicle over different instances of time by processing the set of phase measurements received at each instance of time with the recurrent neural network to produce the position of the vehicle at each instance of time.

2. The positioning system of claim 1, wherein the recurrent neural network uses an attention-based multimodal fusion to output the position in response to receiving the set of phase measurements.

3. The positioning system of claim 1, wherein the recurrent neural network applies different weights to at least some different phase measurements to produce a set of weighted phase measurements and determines the position of the vehicle from the set of weighted phase measurements.

4. The positioning system of claim 1, wherein the recurrent neural network is trained to
determine individual weights of phase measurements of each satellite based on current and previous temporal features of the phase measurements of the satellite;
determine joint weights of combined individually weighted phase measurements of the multiple satellites based on previous joint weights; and
estimate the position of the vehicle from the combined individually weighted phase measurements that are weighted with the joint weights.

5. The positioning system of claim 4, wherein the recurrent neural network is further trained to
extract current temporal features of the phase measurements of the satellite from a sequence of phase measurements collected over a current window of time;
retrieve previous temporal features of the phase measurements of the satellite determined for a sequence of phase measurements collected over a previous window of time and individual weights determined for the previous temporal features; and
determine the individual weights for the current temporal features that characterize temporal dependencies in the input phase measurements by adjusting the individual weights or temporal attention weights determined for the previous temporal features based on comparison of the current temporal features with the previous temporal features.

6. The positioning system of claim 4, wherein the recurrent neural network is further trained to
combine the individually weighted phase measurements received from the multiple satellites over a current window of time to produce the combined individually weighted phase measurements for the current window of time;
retrieve previously combined individually weighted phase measurements determined for a previous window of time;
retrieve previous joint weights determined for the previously combined individually weighted phase measurements; and
determine the joint weights that characterize temporal dependencies in the whole input phase measurements by adjusting previous joint weights based on comparison of the combined individually weighted phase measurements and the previously combined individually weighted phase measurements.

7. The positioning system of claim 1, wherein the recurrent neural network is trained for a specific path, such that the processor tracks the position of the vehicle traveling along at least a portion of the specific path.

8. The positioning system of claim 7, wherein the vehicle is a train traveling along the specific path.

9. The positioning system of claim 1, wherein the memory stores a set of recurrent neural networks, each recurrent neural network is trained for a specific path, wherein the processor selects the recurrent neural network from the set of recurrent neural networks based on the tracking.

10. The positioning system of claim 1, wherein the memory stores a set of recurrent neural networks, each recurrent neural network is trained for a specific path, wherein the processor uses different recurrent neural networks from the set of recurrent neural networks during the tracking.

11. The positioning system of claim 1, wherein the positioning system is a distributed system implemented over a vehicular network including the vehicle in communication with an access point of the vehicular network, wherein the recurrent neural network is stored in the memory of the access point and is trained to determined positions in an area of the vehicular network covered by the access point.

12. The positioning system of claim 11, wherein the processor uses different recurrent neural networks stored at different access points of the vehicular network during the tracking.

13. The positioning system of claim 11, further comprising:
a transmitter to transmit the phase measurements to the access point.

14. The positioning system of claim 11, wherein the processor is running by the access point, further comprising:
a transceiver to transmit the phase measurements to the access point and to receive estimates of the position of the vehicle from the access point.

15. The positioning system of claim 1, further comprising:
a navigator configured to track the position of the vehicle to produce a log file including phase measurements and corresponding position estimates;
a trainer configured to train the recurrent neural network using data extracted from the log file; and
a switcher configured to switch the tracking from the navigator to the recurrent neural network when the recurrent neural network is trained.

16. The positioning system of claim 1, wherein the processor processes the set of phase measurements received at each instance of time with the recurrent neural network without testing the phase measurements for the multipath transmission.

17. A positioning method for tracking a position of a vehicle, wherein the method uses a processor coupled with stored instructions implementing the method, wherein the instructions, when executed by the processor carry out steps of the method, comprising:
receiving phase measurements of satellite signals received at the vehicle at multiple instances of time from multiple satellites;
accessing a recurrent neural network trained to determine a position of the vehicle from a set of phase measurements in a presence of noise caused by a multipath transmission of at least some of the satellite signals at some instances of time; and
tracking the position of the vehicle over different instances of time by processing the set of phase measurements received at each instance of time with the recurrent neural network to produce the position of the vehicle at each instance of time.

18. The positioning method of claim 17, wherein the recurrent neural network uses an attention-based multimodal fusion to output the position in response to receiving the set of phase measurements.

19. The positioning method of claim 17, wherein the recurrent neural network applies different weights to at least some different phase measurements to produce a set of weighted phase measurements and determines the position of the vehicle from the set of weighted phase measurements.

20. A non-transitory computer readable storage medium embodied thereon a program executable by a processor for performing a method, the method comprising:
receiving phase measurements of satellite signals received at the vehicle at multiple instances of time from multiple satellites;
accessing a recurrent neural network trained to determine a position of the vehicle from a set of phase measurements in a presence of noise caused by a multipath transmission of at least some of the satellite signals at some instances of time; and
tracking the position of the vehicle over different instances of time by processing the set of phase measurements received at each instance of time with the recurrent neural network to produce the position of the vehicle at each instance of time.

\* \* \* \* \*